United States Patent
Uchiyama et al.

(10) Patent No.: US 7,234,822 B2
(45) Date of Patent: Jun. 26, 2007

(54) LIGHT PROPAGATION STRUCTURE AND OPTICAL DISPLAY DEVICE OF OPTICAL SYSTEM, LIGHT PROPAGATION METHOD OF OPTICAL SYSTEM, AND DISPLAY METHOD OF OPTICAL DISPLAY DEVICE

(75) Inventors: Shoichi Uchiyama, Suwa-gun (JP); Yoshitaka Itoh, Matsumoto (JP); Junichi Nakamura, Shiojiri (JP); Takashi Nitta, Chino (JP); Tsunemori Asahi, Hotaka-machi (JP)

(73) Assignee: Seiko Epson Corporation, Tokyo (JP)

( * ) Notice: Subject to any disclaimer, the term of this patent is extended or adjusted under 35 U.S.C. 154(b) by 197 days.

(21) Appl. No.: 11/015,420

(22) Filed: Dec. 20, 2004

(65) Prior Publication Data
US 2005/0271312 A1 Dec. 8, 2005

(30) Foreign Application Priority Data
Dec. 24, 2003 (JP) ............................. 2003-427208
Oct. 13, 2004 (JP) ............................. 2004-299284

(51) Int. Cl.
G03B 21/14 (2006.01)
G02F 1/1335 (2006.01)

(52) U.S. Cl. ........................... 353/102; 353/31; 349/69

(58) Field of Classification Search ............. 353/30.31, 353/29, 85–89, 94, 97, 122, 102; 349/7–9, 349/56, 57, 61, 62; 348/750, 751, 758, 777
See application file for complete search history.

(56) References Cited

U.S. PATENT DOCUMENTS 5,784,129 A * 7/1998 Konuma et al. ............ 348/739
6,568,815 B2 * 5/2003 Yano ............................ 353/84
6,796,658 B2 * 9/2004 Hubel et al. .................. 353/31
6,863,401 B2 * 3/2005 Penn ............................ 353/31
2002/0036754 A1 * 3/2002 Nishida ........................ 353/31

FOREIGN PATENT DOCUMENTS

| JP | A-05-224155 | 9/1993 |
| JP | A-09-116840 | 5/1997 |
| JP | A-2001-100689 | 4/2001 |
| WO | WO 02/069030 A2 | 9/2002 |

OTHER PUBLICATIONS

"Bilateral Telecentric Lens"; Feb. 2001.

* cited by examiner

Primary Examiner—W. B. Perkey
Assistant Examiner—Andrew Sever
(74) Attorney, Agent, or Firm—Oliff & Berridge, PLC

(57) ABSTRACT

A projection-type display device 100 including a light source 10, a luminance modulation light valve having a plurality of pixels capable of independently controlling a transmission factor T1, dichroic mirrors 44a and 44b that divided the light from the luminance modulation light valve into the three primary colors of red, green and blue, a plurality of color modulation light valves into which light divided with dichroic mirrors 44a and 44b respectively enters and have a plurality of pixels capable of independently controlling a transmission factor T2, and a dichroic prism 48 that synthesizes light from each of the color modulation light valves, and is provided with a relay optical system 16 on the light path of a luminance modulation section 14 and a color modulation section 18 that forms an optical image of the luminance modulation light valve on the pixel surfaces of each of the color modulation light valves.

18 Claims, 17 Drawing Sheets

FIG. 7

| CONTROL VALUE | 0 | 1 | 2 | 3 | 4 | 5 |
|---|---|---|---|---|---|---|
| TRANSMISSION FACTOR | 0.003 | 0.006 | 0.009 | 0.012 | 0.017 | 0.025 |
| CONTROL VALUE | 6 | 7 | 8 | 9 | 10 | 11 |
| TRANSMISSION FACTOR | 0.038 | 0.06 | 0.09 | 0.15 | 0.23 | 0.33 |
| CONTROL VALUE | 12 | 13 | 14 | 15 | | |
| TRANSMISSION FACTOR | 0.44 | 0.52 | 0.57 | 0.6 | | |

| CONTROL VALUE | 0 | 1 | 2 | 3 | 4 | 5 |
|---|---|---|---|---|---|---|
| TRANSMISSION FACTOR | 0.004 | 0.007 | 0.010 | 0.013 | 0.018 | 0.026 |
| CONTROL VALUE | 6 | 7 | 8 | 9 | 10 | 11 |
| TRANSMISSION FACTOR | 0.04 | 0.07 | 0.10 | 0.16 | 0.24 | 0.35 |
| CONTROL VALUE | 12 | 13 | 14 | 15 | | |
| TRANSMISSION FACTOR | 0.45 | 0.52 | 0.57 | 0.6 | | |

420R $T_{15} = (T_{11} \times 25 + T_{12} \times 5 + T_{13} \times 5 + T_{14} \times 1)/36$ $$T_{19} = (T_{15} \times 1 + T_{16} \times 4 + T_{17} \times 4 + T_{18} \times 16)/25$$

| INPUT VALUE | 0 | 1 | 2 | 3 | 4 | 5 |
|---|---|---|---|---|---|---|
| LUMINANCE LEVEL Rp | 0.012 | 5.0 | 10.0 | 20.0 | 35.0 | 55.0 |
| INPUT VALUE | 6 | 7 | 8 | 9 | 10 | 11 |
| LUMINANCE LEVEL Rp | 80.0 | 107.0 | 135.0 | 165.0 | 195.0 | 225.0 |
| INPUT VALUE | 12 | 13 | 14 | 15 | | |
| LUMINANCE LEVEL Rp | 255.0 | 290.0 | 325.0 | 360.0 | | |

460

LIGHT PROPAGATION STRUCTURE AND OPTICAL DISPLAY DEVICE OF OPTICAL SYSTEM, LIGHT PROPAGATION METHOD OF OPTICAL SYSTEM, AND DISPLAY METHOD OF OPTICAL DISPLAY DEVICE

BACKGROUND OF THE INVENTION

1. Field of the Invention

The present invention relates to a structure and device as well as a method applied to an optical system that modulates light from a light source through a plurality of optical modulation elements, and more particularly, to an optical propagation structure and optical display device of an optical system preferable for improving imaging accuracy and highly accurate modulation, a light propagation method of an optical system and a display method of an optical display device.

Priority is claimed on Japanese Patent Application No. 2003-427208 filed Dec. 24, 2003, and Japanese Patent Application No. 2004-299284 filed Oct. 13, 2004, the content of which are incorporated herein by reference.

2. Description of the Related Art

Dramatic improvements have been made in recent years in the image quality of liquid cry displays (LCD), EL, plasma displays, cathode ray tubes (CRT), projectors and other optical display devices, and performance with respect to resolution and color gamut are nearly comparable to human vision characteristics. However, the reproduction range of luminance dynamic range is at best about 1 to $10^2$ nit, while the number of gradations is typically 8 bits. On the other hand, the luminance dynamic range that can be visualized all at once by human vision is about $10^{-2}$ to $10^{-4}$ nit, while luminance discrimination ability is about 0.2 nit, and when this is converted into a number of gradations, it is said to be equivalent to 12 bits. When considering the displayed images of current optical display devices in terms of these vision characteristics, the narrowness of the luminance dynamic range is conspicuous, and due to a lack of gradation of shadowed and highlighted areas, displayed images appear to lack realism and impact.

In addition, in the field of computer graphics (CG) used in movies and video games, there is a growing trend to pursue greater depiction reality by giving a luminance dynamic range and number of gradations that approach human vision to display data (referred to as high dynamic range (HDR) display data). However, due to the lack of performance of optical display devices that display that data, there is the problem in which CG images are unable to adequately demonstrate their inherent expressive capabilities.

Moreover, 16-bit color space is scheduled to be employed in next-generation operating systems (OS), resulting in a dramatic increase in the luminance dynamic range and number of gradations as compared with current 8-bit color space. Consequently, it is desirable to realize optical display devices capable of taking advantage of 16-bit color space.

Among optical display devices, liquid crystal projectors, DLP projectors and other projection-type display devices are capable of large-screen display, and are effective devices in terms of reproducing reality and impact of displayed images. In this field, the following proposals have been made to solve the aforementioned problems.

Technology for a high dynamic range projection-type display device is disclosed in, for example, Patent Document 1 (Japanese Unexamined Patent Application, First Publication No. 9-116840). This display device is provided with a light source, a first optical modulation element that modulates the luminance of the entire wavelength region of the light, and a second optical modulation element that modulates luminance of the wavelength region for each wavelength region of three primary colors of red, green and blue (RGB) within the wavelength region of the light. In this device, light from the light source forms a desired luminance distribution by modulating with the first optical modulation element, the optical image is then transmitted to the pixel surfaces of the second optical modulation element to modulate the color, after which the secondary modulated light is projected. Each pixel of the first optical modulation element and second optical modulation element is individually controlled based on a first control value and second control value, respectively, that are determined from HDR display data. Transmitting modulation elements having a pixel structure or segment structure that allows independent control of the transmission factor and are capable of controlling the two dimensional distribution of transmission factor are used for the optical modulation elements. A typical example of this is a liquid crystal light valve. In addition, a reflecting modulation element may be used instead of a transmitting modulation element, and a typical example of this is a digital micromirror device (DMD).

The following considers the case of using an optical modulation element having a dark display transmission factor of 0.2% and a bright display transmission factor of 60%. In the case of the optical modulation element alone, the luminance dynamic range is 60/0.2=300. Since the aforementioned projection-type display device of the prior art is equivalent to optically arranging optical modulation elements having a luminance dynamic range of 300 in series, a luminance dynamic range of 300×300=90,000 can be realized. In addition, since the same approach is valid for the number of gradations, a number of gradations in excess of 8 bits can be obtained by optically arranging optical modulation elements having a gradation of 8 bits in series.

In addition, another example of a projection-type display device that realizes a high luminance dynamic range is known that is disclosed in, for example, Patent Document 2 (Japanese Unexamined Patent Application, First Publication No. 2001-100689).

The invention described in Patent Document 2 is provided with a light source, a first optical modulation element, an optical isolator that divides light from the first optical modulation element into the three colors of red, green and blue (RGB), a plurality of second optical modulation elements into which the light divided with the optical isolator respectively enters, and a cross prism that synthesizes the light from each of the second optical modulation elements, wherein light from the light source is modulated through the first and second optical modulation elements to display an image. In the invention described in Patent Document 2, the first optical modulation element forms an image on the second optical modulation elements through the use of optical lenses that compose an illumination optical system.

However, in the invention described in Patent Document 1, even though an optical isolator is provided between the first and second optical modulation elements and the first and second optical modulation elements are separated from each other, since there is no lens or other image-forming means between them, there was the problem of it being difficult to accurately transmit the optical image of the first optical modulation element to the pixel surfaces of the second optical modulation element. In addition, in the invention described in Patent Document 2, although image-forming accuracy can be improved to a certain extent if that having high accuracy is used for the lenses, mirrors and other optical components that compose the illumination optical system, there was the problem of composing with highly accurate optical components leading to increased costs.

FIG. 21 is a drawing showing the constitution of a light path of a first optical modulation element and a second optical modulation element in a projection-type display device described in Patent Document 2. Furthermore, although mirrors and other optical elements are also arranged in an actual light path, these optical elements are omitted from FIG. 21 in order to facilitate understanding of the following explanation.

In the optical system of FIG. 21, a first optical modulation element 130 for modulating luminance is arranged on the side of the light source with fly eye lenses 112a and 112b in between and second optical modulation element 140 for modulating color is arranged on the opposite side of the light source with fly eye lenses 112a and 112b in between. In this optical system, the optical image of each element lens that composes fly eye lens 112a close to first optical modulation element 130 is formed on the pixel surfaces of second optical modulation element 140. Consequently, in order to obtain a desired luminance distribution, this distribution of luminance must be formed for each element lens. However, fly eye lenses 112a and 112b are optical elements used for the purpose of making the luminance distribution uniform, and the number of element lenses is preferably large to achieve this objective. This being the case, the size of each lens is inevitably smaller than the size of second optical modulation element 140. More specifically, lenses that are one-third to one-fifth the size of second optical modulation element 140 are used. When considering that the pixels of second optical modulation element 140 and the pixels of first optical modulation element 130 are made to correspond on a 1:1 basis, the pixel density of first optical modulation element 130 is required to be three to five times the pixel density of second optical modulation element 140. However, current optical modulation elements (e.g., liquid crystal light valves) already have pixel densities that approach the upper limit of hyperfine processing technology in order to achieve higher resolution, and in consideration of this point, it would be difficult to attempt to realize a pixel density that is three to five times greater in first optical modulation element 130. Thus, the accuracy of the lance distribution capable of being formed with first optical modulation element 130 is forced to be three to five times cruder than the pixel density of second optical modulation element 140. Moreover, since optical images of each element lens are formed on the pixel surfaces of second optical modulation element 140 with only two lenses consisting of fly eye lens 112b and converging lens 12d located far from first optical modulation element 130, aberration is unable to be adequately corrected which inevitably results in considerable blurring of the images. Accordingly, there was the problem of it being difficult accurately adjust luminance.

Therefore, in consideration of the unresolved problems of the prior art as described above, the object of the present invention is to provide a light propagation structure and optical display device of an optical system preferable for improving image-forming accuracy and highly accurate modulation without increasing costs, along with a light propagation method of an optical system and a display method of an optical display device.

SUMMARY OF THE INVENTION

In order to achieve the aforementioned object, a light propagation structure of an optical system of the first invention is:

a structure applied to an optical system that modulates light from a light source through a first optical modulation element and each of a plurality of second optical modulation elements, including: a first optical modulation element having a plurality of pixels capable of independently controlling light propagation characteristics, an optical separation unit that divides light from the first optical modulation element into light of a plurality of different specific wavelength regions, and a plurality of second optical modulation elements into which the light divided with the optical separation unit respectively enter and having a plurality of pixels capable of independently controlling light propagation characteristics, wherein a relay optical system is provided in the light path of the first optical modulation element and the optical separation unit that forms an optical image of the first optical modulation element on the pixel surfaces of each of the second optical modulation elements.

In the case of this constitution, light from the light source is primarily modulated by the first optical modulation element, light from the first optical modulation element is divided into light of a plurality of different specific wavelength regions by the optical separation unit, and the divided light enters each of the second optical modulation elements. At this time, an optical image of the first optical modulation element is formed on the pixel surfaces of each of the second optical modulation elements through the relay optical system. The light from the optical separation unit is respectively secondarily modulated by each of the second optical modulation elements.

As a result, since light from a light source is modulated through a first optical modulation element and a plurality of second optical modulation elements, the effect is obtained of being able to obtain a comparatively high luminance dynamic range and number of gradations. In addition, since an optical image of a first optical modulation element is formed on the pixel surfaces of a plurality of second optical modulation elements trough a relay optical system, together with the optical image of the first optical modulation element being able to be formed with comparatively high accuracy on the pixel surfaces of the second optical modulation elements, the pixel surfaces of the first optical modulation element can be made larger, thereby enabling comparatively highly accurate modulation. Thus, the effect is obtained by which the possibility of deterioration of image quality can be reduced as compared with the prior art. Moreover, since high-precision optical components do not have to be used for the optical components of an illumination optical system, the effect is also obtained by which increases in costs can be suppressed.

Furthermore, the relay optical system may be composed using either transmitting optical elements (such as lenses) or reflecting optical elements (such as mirrors) or both.

In addition, the relay optical system can be composed to have bilateral telecentricity. In this constitution, the brightness, tint, contrast and so forth of images formed on the pixel surfaces of the second optical modulation elements can be reliably made to be uniform, thereby making image display quality satisfactory. Moreover, in this constitution, the tolerance range with respect to the arranged location of the second optical modulation elements in the direction of the optical axis can be allowed to be comparatively wide, thereby simplifying the design and constitution and reducing production costs.

Here, light propagation characteristics refer to characteristics that have an effect on the propagation of light, examples of which include light transmission factor, reflection factor, refractive index and other propagation characteristics. This applies similarly in the following optical display device of the second invention, light propagation method of an optical system of the ninth invention, and display method of an optical display device of the tenth invention.

In addition, any medium can be used for the light source provided it is a medium that generates light, examples of which include light sources incorporated into an optical system in the manner of a lamp, or external light sources such as the sun or an interior light. This applies similarly in the following light propagation method of an optical system of the ninth invention.

In addition, a specific wavelength region is not limited to that which is set to each of the three primary colors of red, green and blue, but rather may be that which is set arbitrarily as necessary. However, setting to the three primary colors of red, green and blue enables existing liquid crystal light valves and so forth to be used without modification, which is advantageous in terms of costs. This applies similarly in the following optical display device of the second invention, light propagation method of an optical system of the ninth invention, and display method of an optical display device of the tenth invention.

On the other hand, in order to achieve the aforementioned object, an optical display device of the second invention is a device that displays images by modulating light from a light source through a first optical modulation element and each of a plurality of second optical modulation elements, including: a light source, a first optical modulation device having a plurality of pixels capable of independently controlling light propagation characteristics, an optical separation unit that divides light form the first optical modulation element into a plurality of different specific wavelength regions, a plurality of second optical modulation elements into which light divided with the optical separation unit respectively enters and have a plurality of pixels capable of independently controlling light propagation characteristics, and a light synthesis unit that synthesizes light from each of the second optical modulation elements, wherein a relay optical system is provided in the light path of the first optical modulation element and the optical separation unit that forms an optical image of the first optical modulation element on the pixel surfaces of each of the second optical modulation elements.

In the case of this constitution, in an optical display device, light from the light source is primarily modulated by the first optical modulation element, light from the first optical modulation element is divided into light of a plurality of different specific wavelength regions by the optical separation unit, and the divided light enters each of the second optical modulation elements. At this time, an optical image of the first optical modulation element is formed on the pixel surfaces of each of the second optical modulation elements through the relay optical system. The light from the optical separation unit is respectively secondarily modulated by each of the second optical modulation elements, and the light from each of the second optical modulation elements is synthesized by the color synthesis unit to display an image.

As a result, since light from a light source is modulated through a first optical modulation element and a plurality of second optical modulation elements, the effect is obtained of being able to obtain a comparatively high luminance dynamic range and number of gradations. In addition, since an optical image of a fist optical modulation element is formed on the pixel surfaces of a plurality of second optical modulation elements through a relay optical system, together with the optical image of the first optical modulation element being able to be formed with comparatively high accuracy on the pixel surfaces of the second optical modulation elements, the pixel surfaces of the first optical modulation element can be made larger, thereby enabling comparatively highly accurate modulation. Thus, the effect is obtained by which the possibility of deterioration of image quality can be reduced as compared with the prior art. Moreover, since high-precision optical components do not have to be used for the optical components of an illumination optical system, the effect is also obtained by which increases in costs can be suppressed. Furthermore, the relay optical system may be composed using transmitting optical elements (such as lenses) or reflecting optical elements (such as mirrors) or both.

Moreover, an optical display device of the third invention is the optical display device of the second invention wherein, the relay optical system has bilateral telecentricity.

In the case of this constitution, the brightness, tint, contrast and so forth of an image formed on the pixel surfaces of the second optical modulation elements can be reliably made to be uniform, thereby making image display quality satisfactory.

In addition, as a result of employing the aforementioned constitution, the tolerance range with respect to the arranged location of the second optical modulation elements in the direction of the optical axis can be allowed to be comparatively wide, thereby simplifying the design and constitution and reducing production costs.

Moreover, an optical display device of the fourth invention is the optical display device of the second invention, wherein a second relay optical system is provided in at least one light path for which the light path length is larger than a specific light path among a plurality of light paths from the optical separation unit to each of the second optical modulation elements, which forms an optical image of the fist optical modulation element on the pixel surfaces of the second optical modulation element corresponding to said light path.

In the case of this constitution, in at least one light path for which the light path length is larger than a specific light path among a plurality of light paths from an optical separation unit to each second optical modulation element, an optical image of a first optical modulation element is formed on the pixel surfaces of the second optical modulation element corresponding to that light path trough the second relay optical system.

As a result, even if a structure is employed in which the light path length from the optical separation unit to each second optical modulation element differs, the effect is obtained in which an optical image of the first optical modulation element is formed with comparatively high accuracy on the pixel surfaces of the second optical modulation elements.

Moreover, an optical display device of the fifth invention is an optical display device of the fourth invention therein, the second relay optical system has a first sub-relay lens, a second sub-relay lens arranged closer to the second optical modulation elements than the first sub-relay lens, and a field lens arranged between the first sub-relay lens and the second sub-relay lens, and the first sub-relay lens, the second sub-relay lens and the field lens are arranged so that an erect optical image of the first optical modulation element formed on or nearby the field lens through the first sub-relay lens is formed as an inverted optical image on the pixel surfaces of the second optical modulation elements through the second sub-relay lens.

In the case of this constitution, an erect optical image of a first optical modulation element formed on or nearby a field lens through a first sub-relay lens is formed as an inverted image on the pixel surfaces of second optical modulation elements through a second sub-relay lens.

As a result, the effect is obtained in which an optical image of the first optical modulation element can be formed on the pixel surfaces of each of the second optical modulation elements at nearly the same luminance distribution.

Moreover, an optical display device of the sixth invention is an optical display device of the second invention, wherein the first and second optical modulation elements are liquid crystal light valves.

In the case of this constitution, the effect is obtained in which increases in costs can be further suppressed since existing optical components can be used.

Moreover, an optical display device of the seventh invention is an optical display device of the second invention, wherein a uniform luminance distribution unit that makes the luminance distribution of light from the light source uniform is provided in the light path of the light source and the first optical modulation element.

In the case of this constitution, the luminance distribution of light from the light source is made to be uniform before entering the first optical modulation element by the uniform luminance distribution unit.

As a result, the effect is obtained in which the possibility of the occurrence of uneven luminance can be decreased.

Moreover, an optical display device of the eighth invention is the optical display device of the seventh invention, wherein the uniform luminance distribution unit has a polarizing conversion element tat polarizes light from the light source corresponding to the polarizing direction capable of entering the first optical modulation element.

In the case of this constitution, light from the light source is polarized corresponding to the polarizing direction capable of entering the first optical modulation element by a polarizing conversion element, and the polarized light enters the first optical modulation element.

As a result, the effect is obtained in which the luminance of displayed images can be improved since a larger quantity of light from the light source is eligible for modulation by the first optical modulation element.

On the other hand, in order to achieve the aforementioned object, a light propagation method of an optical system of the ninth invention is a method that is applied to an optical system that modulates light from a light source through a first optical modulation element and each of a plurality of second optical modulation elements, including: a first optical modulation element having a plurality of pixels capable of independently controlling light propagation characteristics, an optical separation unit that divides light from the first optical modulation element into light of a plurality of different specific wavelength regions, and a plurality of second optical modulation elements into which the light divided with the optical separation unit respectively enter and having a plurality of pixels capable of independently controlling light propagation characteristics, wherein an optical image of the first optical modulation element is formed on the pixel surfaces of each of the second optical modulation elements through a relay optical system in the light path of the first optical modulation element and the optical separation unit.

As a result, the same effect is obtained as that of the light propagation structure of an optical system of the first invention.

Furthermore, the relay optical system may be composed using either transmitting optical elements (such as lenses) or reflecting optical elements (such as mirrors) or both.

In addition, the relay optical system can be composed to have bilateral telecentricity. In this constitution, the brightness, tint, contrast and so forth of images formed on the pixel surfaces of the second optical modulation elements can be reliably made to be uniform, thereby making image display quality satisfactory. Moreover, in this constitution, the tolerance range with respect to the arranged location of the second optical modulation elements in the direction of the optical axis can be allowed to be comparatively wide, thereby simplifying the design and constitution and reducing production costs.

On the other hand, in order to achieve the aforementioned object, a display method of an optical display device of the tenth invention is a display method of an optical display device that displays images by modulating light from a light source through a first optical modulation element and each of a plurality of second optical modulation elements, including: a light source, a first optical modulation device having a plurality of pixels capable of independently controlling light propagation characteristics, an optical separation unit that divides light form the first optical modulation element into a plurality of different specific wavelength regions, a plurality of second optical modulation elements into which light divided with the optical separation unit respectively enters and have a plurality of pixels capable of independently controlling light propagation characteristics, and a light synthesis unit that synthesizes light from each of the second optical modulation elements, wherein an optical image of the first optical modulation element is formed on the pixel surfaces of each of the second optical modulation elements through a relay optical system in the light path of the first optical modulation element and the optical separation unit.

As a result, the same effect is obtained as that of the optical display device of the second invention.

Moreover, a display method of an optical display device of the eleventh invention is a display method of an optical display device of the tenth invention, wherein in at least one light path for which the light path length is larger than a specific light path among a plurality of light paths from the optical separation unit to each of the second optical modulation elements, an optical image of the first optical modulation element is formed on the pixel surfaces of the second optical modulation element corresponding to said light path through a second relay optical system.

As a result, the same effect is obtained as that of the optical display device of the fourth invention.

Moreover, a display method of an optical display device of the twelfth invention is a display method of an optical display device of the eleventh invention, wherein the second relay optical system has a first sub-relay lens, a second sub-relay lens arranged closer to the second optical modulation elements than the first sub-relay lens, and a field lens arranged between the first sub-relay lens and the second sub-relay lens, and an erect optical image of the first optical modulation element formed on or nearby the field lens through the first sub-relay lens is formed as an inverted optical image on the pixel surfaces of the second optical modulation elements through the second sub-relay lens.

As a result, the same effect is obtained as that of the optical display device of the fifth invention.

Moreover, a display method of an optical display device of the thirteenth invention is a display method of an optical display device of any of the ninth through twelfth inventions, wherein the first and second optical modulation elements are liquid crystal light valves.

As a result, the same effect is obtained as that of the optical display device of the fifth invention.

Moreover, a display method of an optical display device of the fourteenth invention is a display method of an optical display device of any of the ninth through thirteenth invention, wherein the luminance distribution of light from the light source is made to be uniform through a uniform luminance distribution unit provided in the light path of the light source and the first optical modulation element.

As a result, the same effect is obtained as that of the optical display device of the fifth invention.

Moreover, a display method of an optical display device of the fifteenth invention is a display method of an optical display device of the fourteenth invention, wherein light from the light source is polarized corresponding to the polarizing direction capable of entering the first optical modulation element through a polarizing conversion element in the light path of the light source and the first optical modulation element.

As a result, the same effect is obtained as that of the optical display device of the eighth invention.

BRIEF DESCRIPTION OF THE DRAWINGS

FIG. 7 is a drawing showing the data structure of a control value registration table 400.

FIG. 8 is a drawing showing the data structure of a control value registration table 420R.

DETAILED DESCRIPTION OF THE INVENTION

The following provides an explanation of embodiments of the present invention with reference to the drawings. FIGS. 1 through 14 are drawings showing embodiments of a light propagation method of an optical system and a display method of an optical display device as claimed in the present invention.

Figure 1:
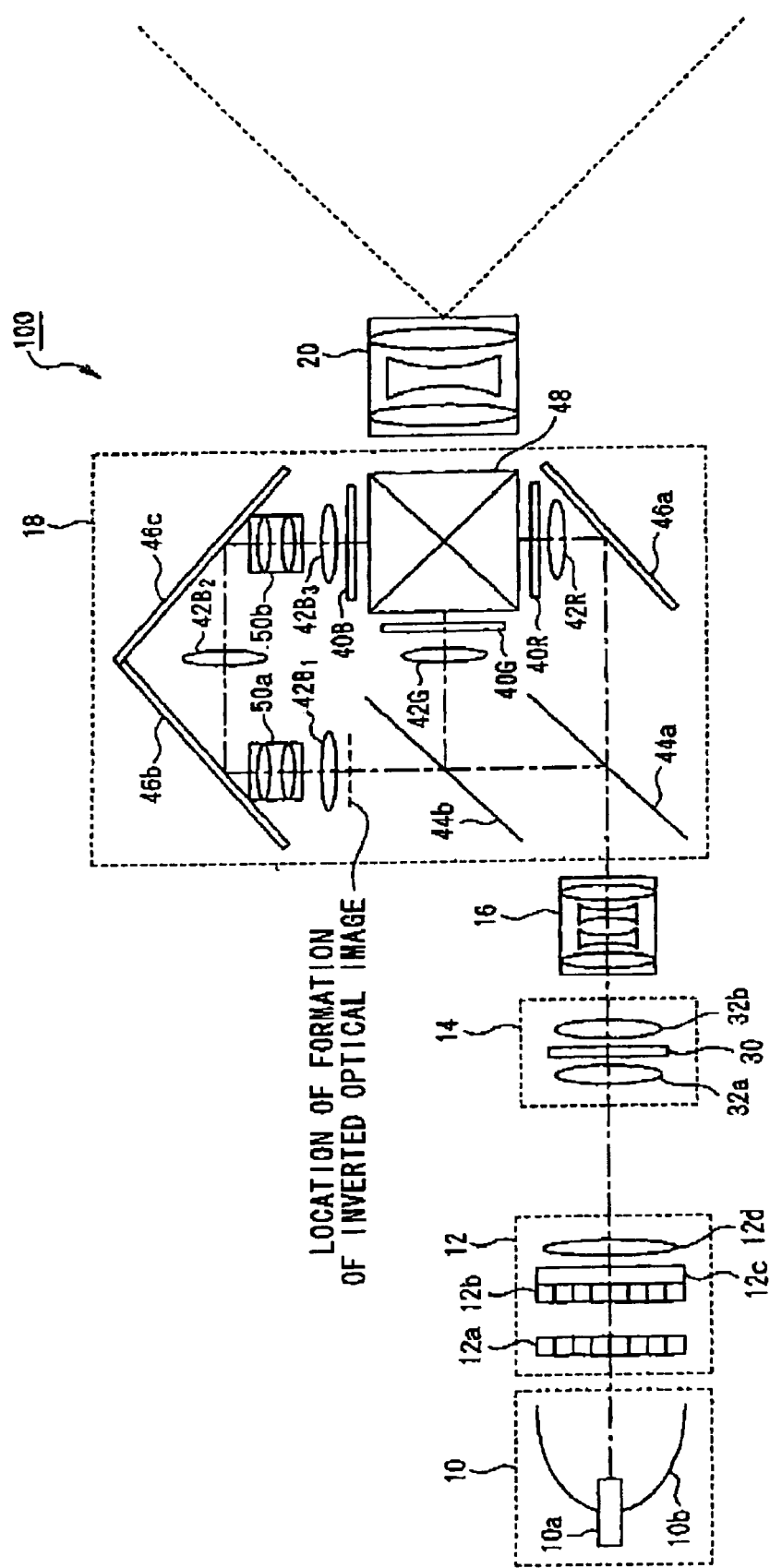
FIG. 1 is a block diagram showing the hardware configuration of a projection-type display device 100.

The present embodiment applies a light propagation structure of an optical system and an optical display device as well as a light propagation method of an optical system and a display method of an optical display device to a projection-type display device 100 shown in FIG. 1.

First, an explanation is provided of the constitution of projection-type display device 100 with reference to FIG. 1.

FIG. 1 is a block diagram showing the hardware configuration of projection-type display device 100.

As shown in FIG. 1, projection-type display 100 is composed of a light source 10, a uniform luminance distribution section 12 that makes the luminance distribution of light entering from light source 10 uniform, a luminance modulation section 14 that modulates luminance of the entire wavelength region of light entering from uniform luminance distribution section 12, a relay lens 16 that relays light entering from luminance modulation section 14, a color modulation section 18 that respectively modulates the luminance of the three primary colors of red, green and blue (RGB) among the entire wavelength region of light entering from relay lens 16, and a projection unit 20 that projects light entering from color modulation section 18 onto a screen (not shown).

Light source 10 is composed of a high-pressure mercury lamp or other lamp 10a, and a reflector 10b that reflects outgoing light from lamp 10a.

Luminance modulation section 14 is composed of a liquid crystal light valve 30, in which a plurality of pixels capable of independently controlling transmission factor are arranged in a matrix, a field lens 32a and a converging lens 32b. Light that enters from uniform luminance distribution section 12 enters through field lens 32a, the luminance of the entire wavelength region of the entered light is modulated by liquid crystal light valve 30, and modulated light is converged by converging lens 32b and emitted to relay lens 16. Relay lens 16 forms an optical image of liquid crystal light valve 30 on liquid crystal light valves 40R, 40G and 40B through dichroic mirrors, field lenses, relay lenses and so forth to be described later.

Color modulation section 18 is composed of three liquid crystal light valves 40R, 40G and 40B, in which a plurality of pixels capable of independently controlling transmission factor are arranged in a matrix and which have higher resolution than liquid crystal light valve 30, five field lenses 42R, 42G and 42B$_1$ through 42B$_3$, two dichroic mirrors 44a and 44b, three mirrors 46a, 46b and 46c, a dichroic prism 48, and two sub-relay lenses 50a and 50b, each composed of a plurality of lenses. First, together with light from relay lens 16 being split into the three primary colors of red, green and blue by dichroic mirrors 44a and 44b, the light enters liquid crystal light valves 40R through 40B through field lenses 42R, 42G and 42B$_1$ through 42B$_3$ and mirrors 46a through 46c. The luminance of the light split into the three primary colors R, G and B is modulated by each liquid crystal light valve 40R through 40B, and the modulated light in the three primary colors of R, G and B is emitted to projection section 20 after being synthesized by dichroic prism 48.

Here, although the optical image of liquid crystal light valve 30 formed by relay lens 16 is formed as an inverted optical image on liquid crystal light valves 40R and 40G, since the light valves to light valve 40B is longer than the light path to liquid crystal light valves 40R and 40G, the optical image is formed at the location of the dotted line in this light path. Therefore, in the light path from dichroic mirror 44b to liquid crystal light valve 40B, the inverted optical image of liquid crystal light valve 30 formed at the location of the dotted line in FIG. 1 is formed as an erect optical image on or near field lens 42B$_2$ through field lens 42B$_1$ and sub-relay lens 50a, and that erect optical image is then formed as an inverted optical image on the pixel surfaces of liquid crystal light valve 40B through sub-relay lens 50b.

In addition to having TN liquid crystal sandwiched between a glass electrode, in which pixel electrodes, thin film transistor elements for driving them, thin film diodes and other switching elements are formed into a matrix, and a glass electrode in which a common electrode is formed over its entire surface, liquid crystal light valves 30 and 40R through 40B are active matrix liquid crystal elements in which polarizing plates are arranged on their outer surfaces. Liquid crystal light valves 30 and 40R through 40B are driven in a normal white mode, in which they are in a white/bright (transmitting) state when a voltage is applied or in a black/dark (non-transmitting) state when a voltage is not applied, or in a normal black mode in which the above states are reversed, and the gradation between bright and dark displays is controlled by analog control corresponding to a given control value.

Uniform luminance distribution section 12 is composed of two fly eye lenses 12a and 12b, a polarizing conversion element 12c and a converging lens 12d. The luminance distribution of light from light source 10 is made to be uniform by fly eye lenses 12a and 12b, the uniform light is polarized in the polarizing direction capable of entering liquid crystal light valve 30 by polarizing conversion element 12c, and the polarized light is converged by converging lens 12d and then emitted to luminance modulation section 14.

Polarizing conversion element 12c is composed of, for example, a PBS array and a half wave plate. The half wave plate converts linear polarized light to linear polarized light perpendicular thereto.

Figure 2:
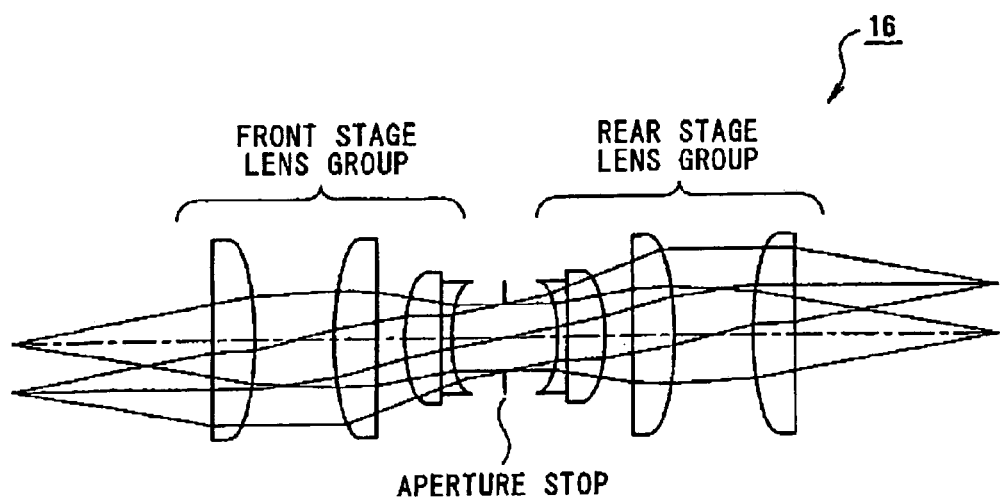
FIG. 2 is a drawing showing the constitution of a relay lens 16.

FIG. 2 is a drawing showing the constitution of relay lens 16.

Relay lens 16 forms an optical image of liquid crystal light valve 30 on the pixel surfaces of each liquid crystal light valve 40R through 40B, and as shown in FIG. 2, and is an equal magnification imaging lens composed of a front stage lens group and rear stage lens group arranged nearly symmetrically about the aperture stop. The front stage lens group and rear stage lens group are composed of a plurality of convex lenses and a single concave lens. However, the shape, size, spacing interval, quantity, telecentricity, magnification and other characteristics of the lenses can be suitably altered according to the required characteristics, and are not limited to the example shown in FIG. 2. Furthermore, in the case of composing relay lens 16 to be bilaterally telecentric, converging lens 32b and field lenses 42R, 42G and 42B$_3$ can be omitted. In addition, the lens configuration shown in FIG. 2 can be similarly applied to sub-relay lenses 50a and 50b.

Figure 3:
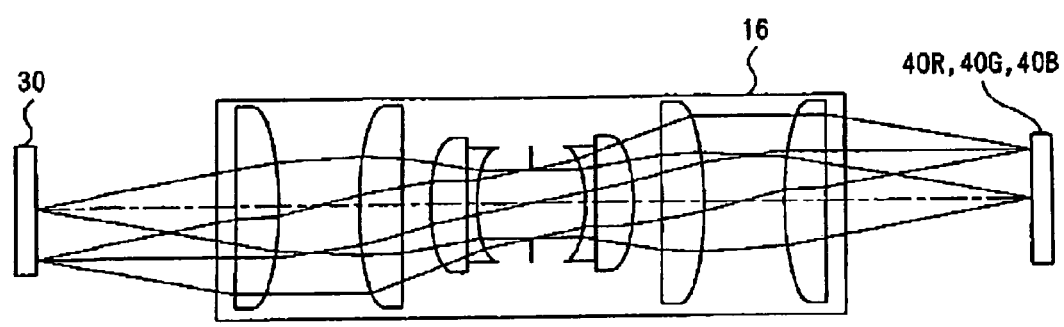
FIG. 3 is a drawing showing the operating principle of a relay lens 16.

FIG. 3 is a drawing snowing the operating principle of relay lens 16.

As shown in FIG. 3, since relay lens 16 typically uses an equal magnification imaging lens, the pixels of liquid crystal light valve 30 and the pixels of liquid crystal light valves 40R through 40B can be made to correspond on a 1:1 basis even if the pixel densities of liquid crystal light valve 30 and liquid crystal light valves 40R through 40B are identical. In addition, since relay lens 16 is composed of a large number of lenses, it has a satisfactory aberration correction, and is able to accurately transmit the luminance distribution formed with liquid crystal light valve 30 to liquid crystal light valves 40R through 40B.

Figure 4A:
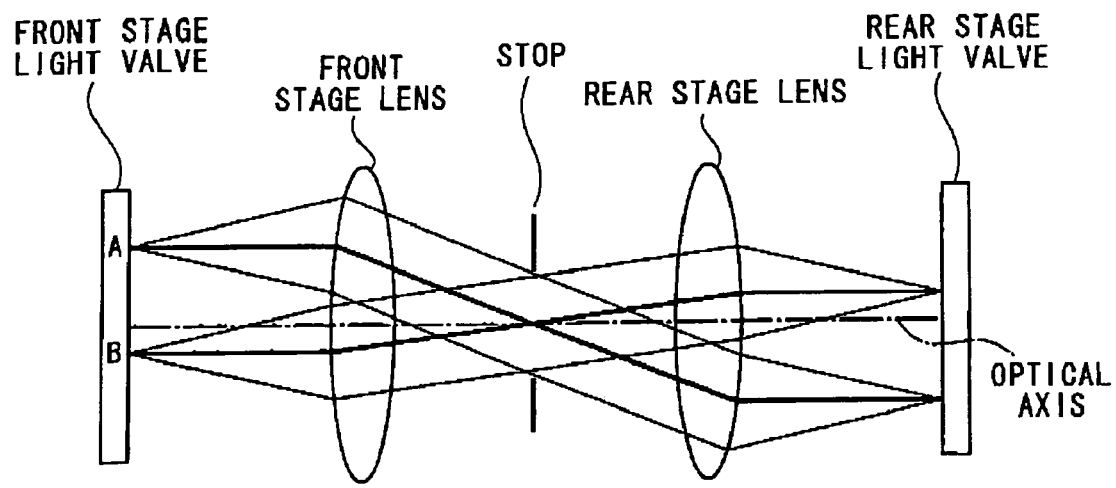
FIG. 4A is a drawing showing a relay lens having bilateral telecentricity.
Figure 4B:
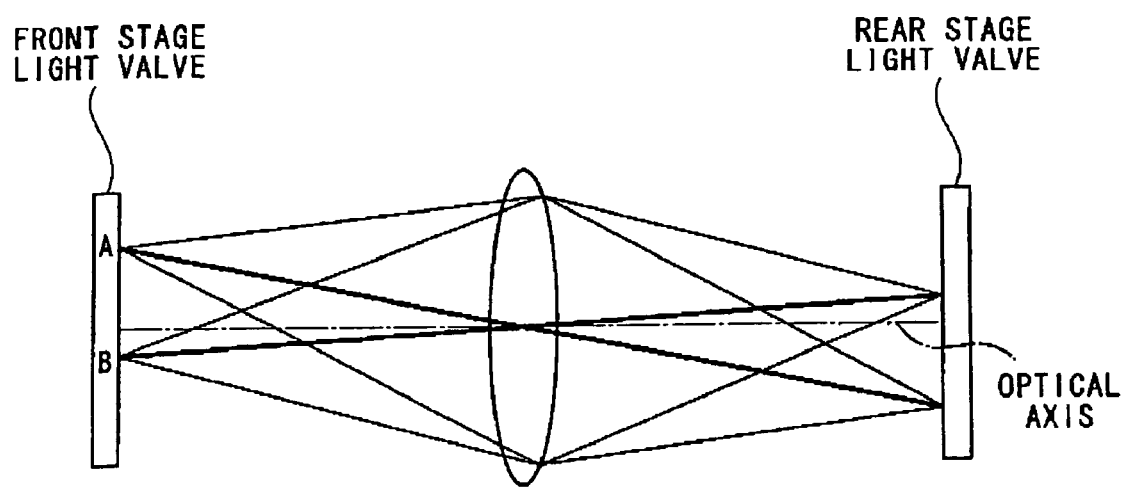
FIG. 4B is a drawing showing a typical relay lens.
Figure 5A:
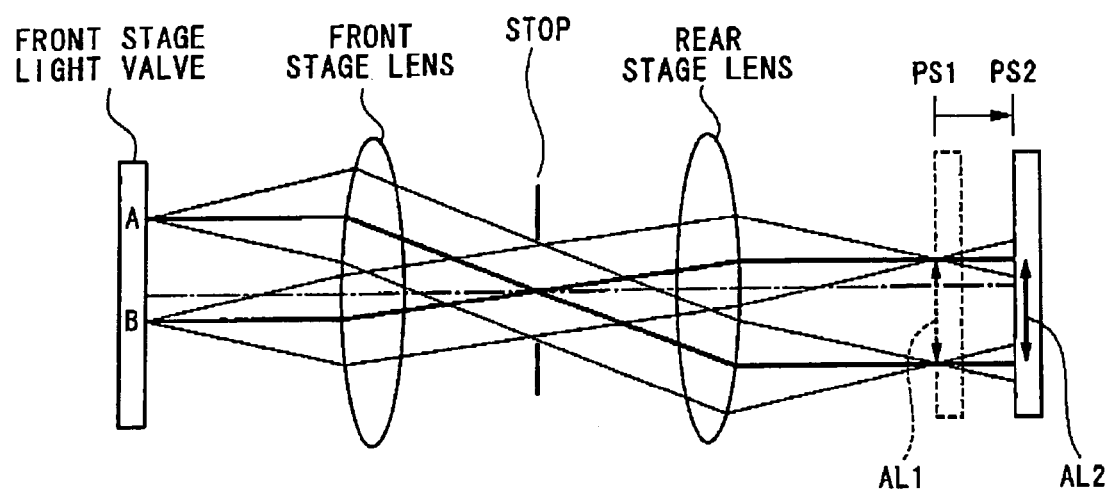
FIG. 5A is a drawing showing a relay lens having bilateral telecentricity
Figure 5B:
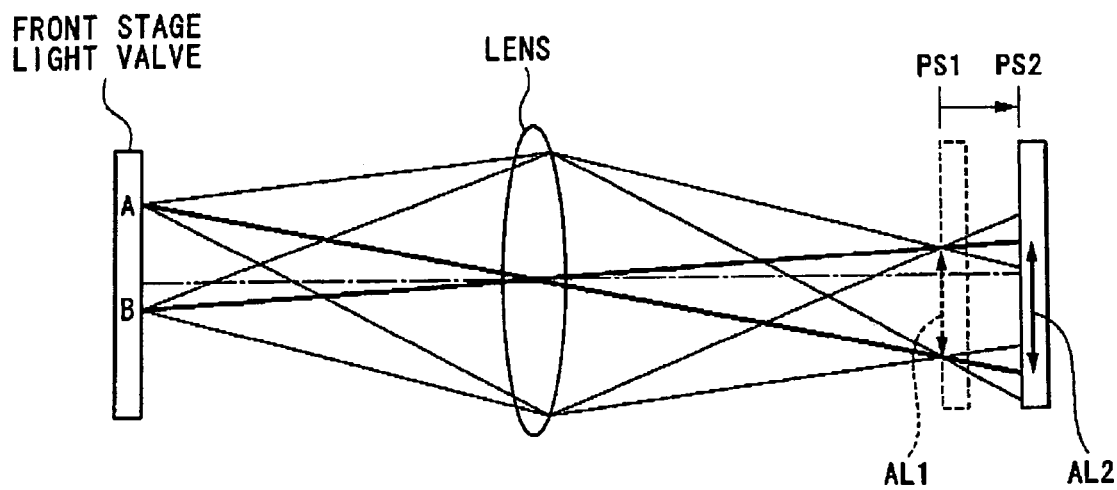
FIG. 5B is a drawing showing a typical relay lens.

FIGS. 4A, 4B, 5A and 5B are drawings for explaining telecentricity, with FIGS. 4A and 5A showing a relay lens having bilateral telecentricity, and FIGS. 4B and 5B showing a typical relay lens.

As shown in FIG. 4A, a telecentric lens refers to a lens in which chief ray indicated with the solid thick line is parallel to the optical axis in the object side space (front stage light valve side) or the image side space (rear stage light valve side), and that which is telecentric with respect to both the object side (front stage light valve side) and image side (rear stage light valve side) is referred to as a bilateral telecentric lens. In a relay lens having bilateral telecentricity, chief ray emitted form the front stage light valve (a liquid crystal light valve in this example) is emitted nearly perpendicularly from any site of the front stage light valve, and enters the rear stage light valve (a liquid crystal light valve in this example) nearly perpendicularly. Thus, the radiation angel distribution of a light bundle emitted from a location (A) far from the optical axis of the front stage light valve is nearly equal when compared with the radiation angle distribution of a light bundle emitted from a location (B) close to the optical axis.

On the other hand, as shown in FIG. 4B, in the case of a typical relay lens, chief ray indicated with the solid thick line has a different radiation angle depending on the outgoing location of the rear stage light valve. Thus, the radiation angle distribution of a light bundle emitted from a location (A) far from the optical axis of the front stage light valve is quite different when compared with the radiation angle distribution of a light bundle emitted from a location (B) close to the optical axis.

However, liquid crystal light valves typically have visual angle dependency. Namely, contrast characteristics, brightness characteristics, spectral characteristics and so forth differ depending on the angle of light beams emitted from the liquid crystal light valve. Thus, in the case of the typical relay lens shown in FIG. 4B, the radiation angle distribution of emitted light bundles differ for each region of the front stage light valve (liquid crystal light valve), and as a result, distribution (non-uniformity) occurs in the brightness, tint and contrast of display images within the screen of the rear stage light valve (liquid crystal light valve), and as a result, distribution (non-uniformity) occurs in the brightness, tint and contrast of display images within the screen of the rear stage light valve (liquid crystal light valve), thereby resulting in the possibility of leading to a decrease in the image display quality of the projector.

In contrast, in the relay lens having bilateral telecentricity shown in FIG. 4A, since emitted light bundles of any region of the front stage light valve (liquid crystal light valve) have nearly the same radiation angle distribution, the brightness, tint and contrast of display images within the screen of the rear stage light valve (liquid crystal light valve) are nearly uniform, thereby resulting in satisfactory image display quality of the projector.

Moreover, as shown in FIG. 4A, in the case of a relay lens having bilateral telecentricity, even if an error occurs in the arranged location of a rear stage light valve in the direction of the optical axis (PS1→PS2 in FIG. 5A), since chief ray is parallel to the optical axis, there is hardly any change in the size of the image of the front stage light valve even though some blurring may occur (AL1≈AL2 FIG. 5A). Namely, even if there is some error in the arranged location of the rear stage light valve, since there is very little decrease in the image display quality in terms of the projector, the production margin is large.

On the other hand, as shown in FIG. 5B, in the case of a typical relay lens, in the case an arrangement error equal to that described above occurs in the rear stage light valve PS1→PS2 in FIG. 5B), since chief ray is not parallel to the optical axis, the size of the image of the front stage light valve changes simultaneous to the occurrence of blurring (AL1<AL2 in FIG. 5B), and as a result, there is the possibility of a significant decrease in the image display quality.

Returning to FIG. 1, projection-type display device 100 has a display control device 200 (not shown) that controls liquid crystal light valve 30 and liquid crystal light valves 40R through 40B. Hereinafter, liquid crystal light valves 40R through 40B are generically referred to as color modulation light valves, and liquid crystal light valve 30 is generically referred to as a luminance modulation light valve in order to distinguish it from the color modulation light valves. In addition, in the present embodiment, the color modulation light valves determine the display resolution (referring to the resolution perceived by an observer when an observer views a display image of projection-type display device 100).

Next, a detailed explanation is provided of the constitution of display control device 200 with reference to FIGS. 6 through 10.

Figure 6:
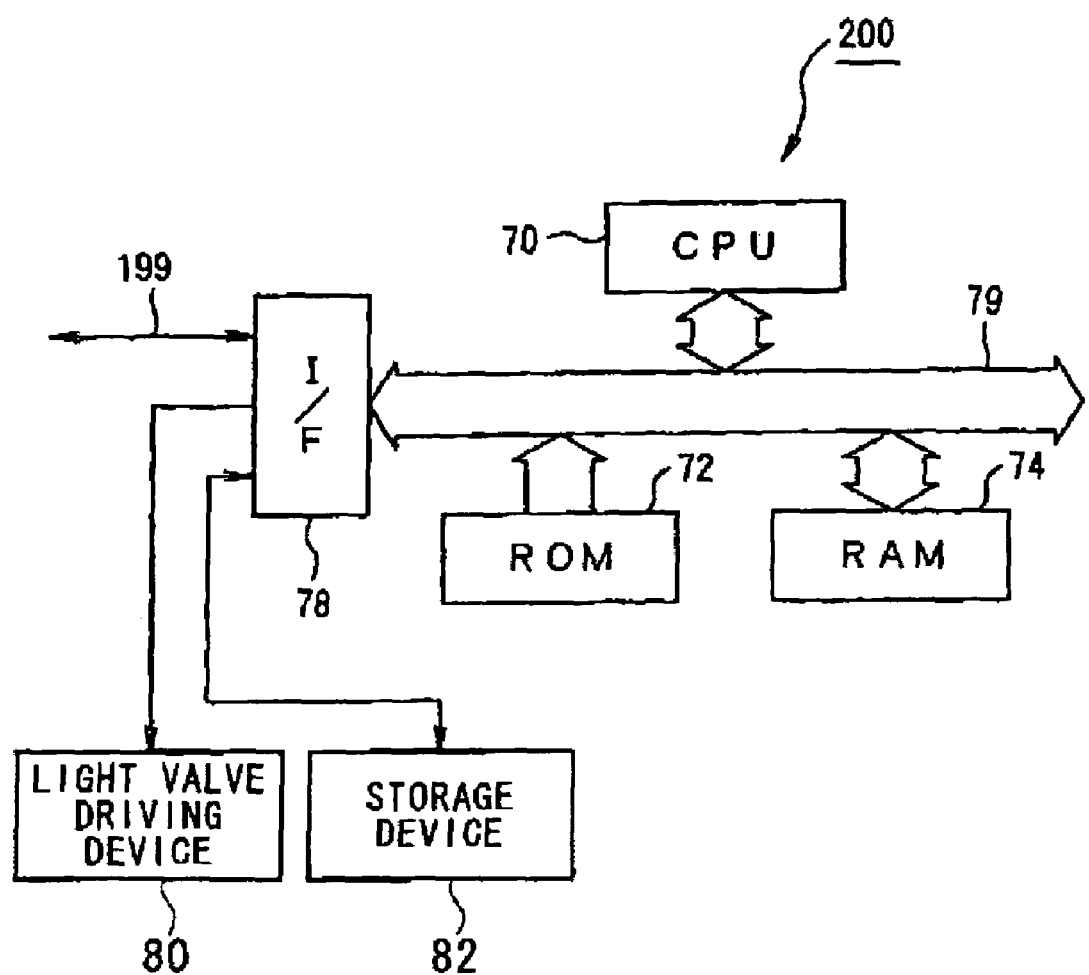
FIG. 6 is a block diagram showing the hardware configuration of a display control device 200.

FIG. 6 is a block diagram showing the hardware configuration of a display control device 200.

As shown in FIG. 6, display control device 200 is composed of a CPU 70 that controls arithmetic processing and the entire system based on a control program, a ROM 72 that stores the control program and so forth of CPU 70 in a predetermined area, a RAM 74 for storing data read from ROM 72 and so forth as well as arithmetic processing result required during the course of arithmetic processing by CPU 70, and an I/F 78 that mediates the input and output of data for an external device, and these are mutually connected while allowing the exchange of data with a bus 79 in the form of a signal line for transferring data.

A light valve driving device 80, which drives the luminance modulation light valve and color modulation light valves, a storage device 82 that stores data, tables and so forth as files, and a signal line for connecting to an external network 199 are connected as external devices to I/F 78.

Storage device 82 stores HDR display data.

HDR display data refers to image data capable of realizing a high luminance dynamic range that cannot be realized with conventional sRGB or other image formats, and stores pixel values that indicate the luminance level of a pixel for all pixels of an image. At present, HDR display data is used in the field of computer graphics (CG) in particular for synthesizing a CG object in an actual background. Although there are various image formats, there are many formats that store pixel values in floating decimal point form in order to realize a higher luminance dynamic range than conventional sRGB and other image formats. In addition, HDR display data is also characterized by stored values being in the form of values relating to physical radiance that does not consider human vision characteristics (radiance=W/(srm$^2$)) or luminance that considers human vision characteristics (luminance=cd/m$^2$). In the present embodiment, a format is used in which pixels values that indicate the radiance level for each of the three primary colors of red, green and blue for a single pixel are stored in the form of floating decimal point values for HDR display data. For example, a value of (1.2,5.4,2.3) may be stored as a pixel value of a single pixel.

HDR display data is generated based on a projected HDR image by projecting a high luminance dynamic range HDR image. However, current film cameras and digital still cameras are unable to capture high luminance dynamic range HDR images in the natural world all at once. Therefore, a single HDR image is generated from a plurality of captured images for which exposure has been changed by some method. Furthermore, a detailed description of methods for generating HDR display data is contained in, for example, Known Document 1 (P. E. Debevec and J. Malik, "Recovering High Dynamic Range Radiance Maps from Photographs", Proceedings of ACM SIGGRAPH97pp. 367–378 (1997)).

The following formulas (1) and (2) are valid when the luminance level of a pixel p contained in HDR display data is taken to be Rp, the transmission factor of a pixel corresponding to pixel p of a luminance modulation light valve is taken to be T1, and the transmission factor of a pixel corresponding to pixel p of a color modulation light valve is taken to be T2

$Rp=Tp \times Rs$ $Tp=T1 \times T2 \times G1$

In formulas (2) and (2), Rs represents the luminance of a light source 10, G represents the gain, and both of these are constants. In addition, Tp is the optical modulation rate.

It can be understood from formulas (1) and 2) that there are an infinite number of combination of T1 and T2 for pixel p. However, this does not mean that T1 and T2 may be determined arbitrarily. Since image quality may deteriorate depending on the manner of their determination, T1 and T2 must be properly determined in consideration of image quality.

In the case the luminance modulation light valve and color modulation light valves have different resolutions, pixel p1 may form an image over a plurality of pixels of the color modulation light valves for a single pixel p1 of the luminance modulation light valve, or conversely, a plurality of pixels of the luminance modulation light valve may form over lapping images on pixel p2 for a single pixel p2 of the color modulation light valves. Here, in the case of calculating transmission factor T1 for pixel p1 of the luminance modulation light valve, if transmission factors T2 of a plurality of mutually overlapping pixels of the color modulation light valves are determined, the average value and so forth of those transmission factors T2 is calculated, the calculated average value and so forth is estimated to be transmission factor T2 of the pixel corresponding to pixel p1 of the color modulation light valves, and transmission factor T1 is calculated from the aforementioned formulas (1) and (2). However, since the average value and so forth is only estimated to be transmission factor T2 of the color modulation light valves, error unavoidably occurs therein. Although this error occurs regardless of the order of determination, namely whether transmission factor T1 of the luminance modulation light valve is determined first or whether transmission factor T2 of the color modulation light valves is determined first, the error for the luminance modulation light valve or color modulation light valves that determine the display resolution should be minimized as much as possible since this has a significant visual effect.

Therefore, the following attempts to examine the manner in which the magnitude of the error changes according to differences in the order of determination. First, the case is considered of determining transmission factor T2 of the color modulation light valves first. This can be calculated by calculating the average value and so forth of transmission factors T2 of the plurality of overlapping pixels of the color modulation light valves and then using the aforementioned formulas (1) and (2) based on the calculated average value and HDR display data. As a result, with respect to pixel p1 of the luminance modulation light valve, although an error occurs in its transmission factor T1 relative to transmission factors T2 of the plurality of overlapping pixels of the color modulation light valves, the magnitude of the error is of the same degree as error that occurs due to statistical calculation of average values and so forth. In contrast, with respect to pixels p2 of the color modulation light valves, even if the average value and so forth of transmission factors T1 of a plurality of overlapping pixels of the luminance modulation light valve, a large error may occur in transmission factor T2 so as to not satisfy the aforementioned formulas (1) and (2) with respect to that average value. This is believed to be the result of the inverse relationship not necessarily being valid even if the relationship with the plurality of overlapping pixels of the color modulation light valves is defined based on pixel p1 (the aforementioned formulas(1) and (2)). Thus, there is a high possibility of the error transmission factors T2 of the color modulation light valves becoming large.

This applies similarly in the opposite case. Namely, in the case of determining transmission factor T1 of the luminance modulation light valve first, there is a high possibility of the error in transmission factor T1 of the luminance modulation light valve becoming large.

On the basis of the above, from the viewpoint of improving image quality, the conclusion is reached that determining the transmission factor of the luminance modulation light valve or color modulation light valves that determines display resolution last is better in terms of lowering the effect of error. In the present embodiment, since the color modulation light valves determine display resolution, the transmission factors T2 of the color modulation light valves are determined last.

In addition, storage device 82 stores a control value registration table 400 in which are registered control values of the luminance modulation light valve.

FIG. 7 is a drawing that shows the data structure of control value registration table 400.

As shown in FIG. 7, a single record is registered for each control value of the luminance modulation light valve in control value registration table 400. Each record is composed of a field in which the control values of the luminance modulation light valve are registered, and a field in which transmission factors of the luminance modulation light valve are registered.

In the example of FIG. 7, a control value of "0" and a transmission factor of "0.003" are respectively registered in the first record. This indicates that when a control value of "0" is output to the luminance modulation light valve, the transmission factor of the luminance modulation light valve becomes 0.3%. Furthermore, although FIG. 7 shows an example of the case in which the number of gradations of the luminance modulation light valve is 4 bits (values of 0 to 15), in actuality, records are registered corresponding to the number of gradations of the luminance modulation light valve. For example, in the case the number of gradations is 8 bits, then 256 records would be registered.

In addition, storage device 82 stores control value registration tables 420R, 420G and 420B in which are registered control values of the color modulation light valves for each color modulation light valve.

FIG. 8 is a drawing showing the data structure of control value registration table 420R.

As shown in FIG. 8, a single record is registered in control value registration table 420R for each control value of liquid crystal light valve 40R. Each record is composed of a field in which is registered the control values of liquid crystal light valve 40R, and a field in which is registered the transmission factors of liquid crystal light valve 40R.

In the example of FIG. 8, a value of "0" is registered for the control value and a value of "0.004" is registered for the transmission factor in the first record. This indicates that when a control value of "0" is output to liquid crystal light valve 40R, the transmission factor of liquid crystal light valve 40R becomes 0.4%. Furthermore, although FIG. 8 shows an example of the case in which the number of gradations of the color modulation light valves is 4 bits (values of 0 to 15), in actuality, records are registered corresponding to the number of gradations of the color modulation light valves. For example, in the case the number of gradations is 8 bits, then 256 records would be registered.

In addition, although the data structures of control value registration tables 420G and 420B are not shown, they have the same data structure as that of control value registration table 420R. However, the difference between these tables and control value registration table 420R is that the transmission factors corresponding to the same control values are different.

Next, an explanation is provided of the constitution of CPU 70 and the processing performed thereby.

CPU 70 is composed of a microprocessing unit (MPU) and so forth. It starts up a predetermined program contained in a predetermined area of ROM 72, and performs the display control processing shown in the flow chart of FIG. 9 in accordance with that program.

Figure 9:
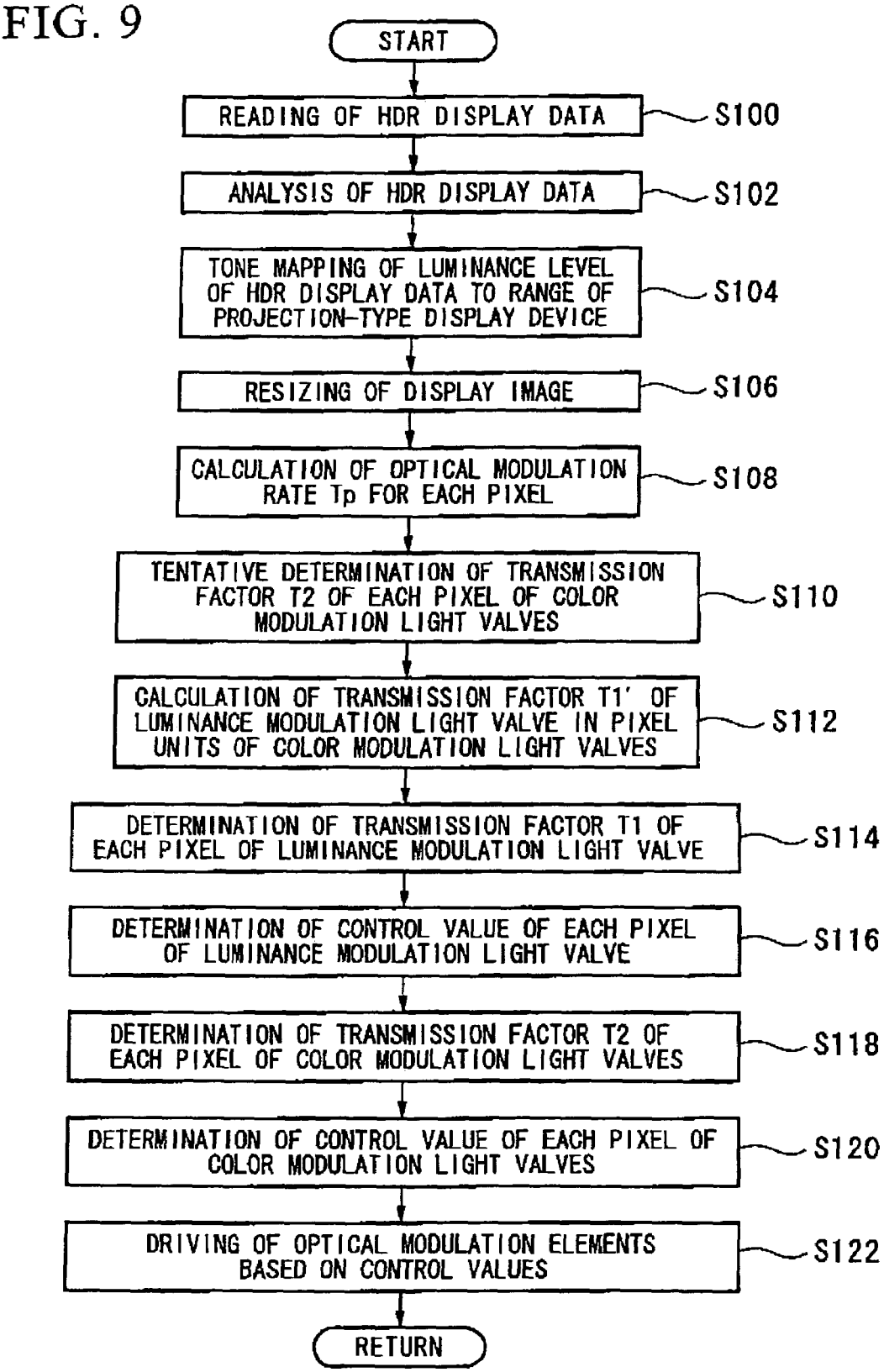
FIG. 9 is a flow chart showing display control processing.

FIG. 9 is a flow chart showing display control processing.

Display control processing consists of determining the respective control values of the luminance modulation light valve and color modulation light valves based on HDR display data, and then driving the luminance modulation light valve and color modulation light valves based on the determined control values. When this processing is performed by CPU 70, processing first proceeds to step S100 as shown in FIG. 9.

In step S100, HDR display data is read from storage device 82.

Next, processing proceeds to step S102 where the read HDR display data is analyzed followed by calculation of a pixel value histogram along with the maximum, minimum and average values of the luminance levels. These analysis results are used to brighten dark scenes, darken excessively bright scenes, coordinate the contrast of intermediate sections and perform other forms of automatic image correction, and are also used for tone mapping.

Next, processing proceeds to step S104 where the luminance levels of HDR display data are tone mapped to the luminance dynamic range of projection-type display device 100 based on the analysis results of step S102.

Figure 10:
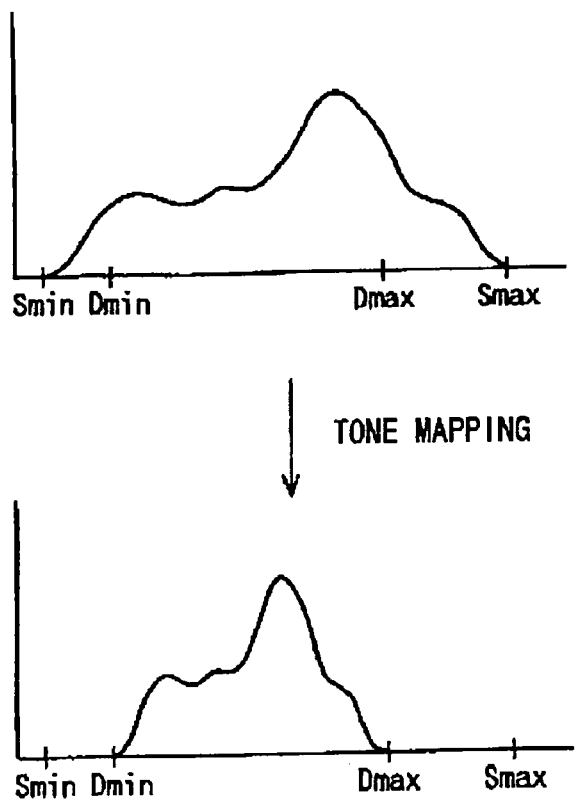
FIG. 10 is a drawing for explaining tone mapping.

FIG. 10 is a drawing for explaining tone mapping processing.

As a result of having analyzed HDR display data, the minimum value of the luminance levels contained in the HDR display data is represented with Smin, while the maximum value is represented with Smax. In addition, the minimum value of the luminance dynamic range of projection-type display device 100 is represented with Dmin, while the maximum value is represented with Dmax. In the example of FIG. 10, since Smin is smaller than Dmin, and Smax is larger than Dmax, HDR display data cannot be properly displayed as is. Therefore, the histogram of Smin to Smax is normalized so as to be contained in the range of Dmin to Dmax.

Furthermore, details regarding tone mapping are described in, for example, Known Document 2 (F. Drago, K. Myszkowski, T. Annen and N. Chiba, "Adaptive Logarithmic Mapping For Displaying High Contrast Scenes", Eurographics 2003, (2003)).

Next, processing proceeds to step S106 where the HDR image is resized (enlarged or reduced) to match the resolution of the color modulation light valves. At this time, the HDR image is resized while maintaining the aspect ratio of the HDR image. Examples of resizing method include the mean value method, intermediate value method and nearest neighbor method.

Next, processing proceeds to step S108 where the optical modulation rate Tp is calculated for each pixel of the resized image using the aforementioned formula (1) based on luminance level Rp of each pixel of the resized image as well as luminance Rs of light source 10.

Next, processing proceeds to step S110 where an initial value (e.g., 0.2) is given as transmission factor T2 of each pixel of the color modulation light valves to tentatively determine transmission factor T2 of each pixel of the color modulation light valves.

Next, processing proceeds to step S112 where transmission factor T1' of the luminance modulation light valve is calculated in pixel units of the color modulation light valves using the aforementioned formula (2) based on the calculation optical modulation rate Tp, the tentatively determined transmission factor T2 and gain G. Here, since the color modulation light valves are composed of three liquid crystal light valves 40R through 40B, transmission factor T1' is calculated for each of the three primary colors of red, green and blue for the same pixel. In contrast, since the luminance modulation light valve is composed of a single liquid crystal light valve 30, their average values are calculated as T1' of that pixel.

Next, processing proceeds to step S114 where the weighted average of transmission factor T1', which has been calculated for each pixel of the color modulation light valves that are overlapping in the light path with that pixel, is calculated as transmission factor T1 of that pixel for each pixel of the luminance modulation light valve. Weighting is carried out according to the sure area ratio of the overlapping pixels.

Next, processing proceeds to step S116 where a control value corresponding to transmission factor T1 calculated for that pixel is read from control value registration table 400 for each pixel of the luminance modulation light valve, and the read control value is determined as the control value of that pixel. When reading out control values, the transmission factor that most closely approximates the read transmission factor T1 is searched for in control value registration table 400, and the control value is read that corresponds to the transmission factor that is found as a result of that search. For example, high-speed searching can be realized by searching using a binary search method.

Next, processing proceeds to step S118 where the weighted average of transmission factor T1 determined for those pixels of the luminance modulation light valve that overlap in the light path with that pixel is calculated for each pixel of the color modulation light valves, and transmission factor T2 of that pixel is calculated using the aforementioned formula (2) based on the calculated average value, optical modulation rate Tp calculated in step S108 and gain G. Weighting is carried out according to the surface area ratio of the overlapping pixels.

Next, processing proceeds to step S120 where control values corresponding to transmission factor T2 calculated for those pixels are read from control value registration tables 420R through 420B for each pixel of the color modulation light valves, and the read control values arm determined as the control values of those pixels. When reading out control values, the transmission factor that most closely approximates the read transmission factor T2 is searched for in control value registration tables 420R through 420B, and the control value is read that corresponds to the transmission factor that is found as a result of that search. For example, high speed searching can be realized by searching using a binary search method.

Next, processing proceeds to step S122 where the control values determined in steps S116 and S120 are output to light valve driving device 80, the display image is projected by respectively driving the luminance modulation light valve and color modulation light valves to complete a single series of processing, after which processing returns to the original processing.

Next, an explanation is provided of the operation of the present embodiment with reference to FIGS. 11 through 14.

In the following explanation, the examples is used in which each of the color modulation light valves has a resolution of 18 pixels horizontally and 12 pixels vertically and 4 bits of gradations, while the luminance modulation light valve has a resolution of 15 pixels horizontally and 10 pixels vertically and 4 bits of gradations.

In display control device 200, HDR display data is read out, the read HDR display data is analyzed, and the luminance level of the HDR display data is tone mapped to the luminance dynamic range of projection-type display device 100 based on those analysis results in steps S100 through S104. Next, in step S106, the HDR image is resized to match the resolution of the color modulation light valves.

Next, the optical modulation rate Tp is calculated for each pixel of the resized image in step S108. For example, if the luminance level Rp (R,G,B) of a pixel p is taken to be (1.2,5.4,2.3) and luminance Rs (R,G,B) of light source 10 is taken to be (10000,10000,10000), then optical modulation rate Tp of pixel p in the resized image becomes (1.2, 5.4, 2.3)/10000, 10000, 10000)=(0.00012,0.00054,0.00023).

Figure 11:
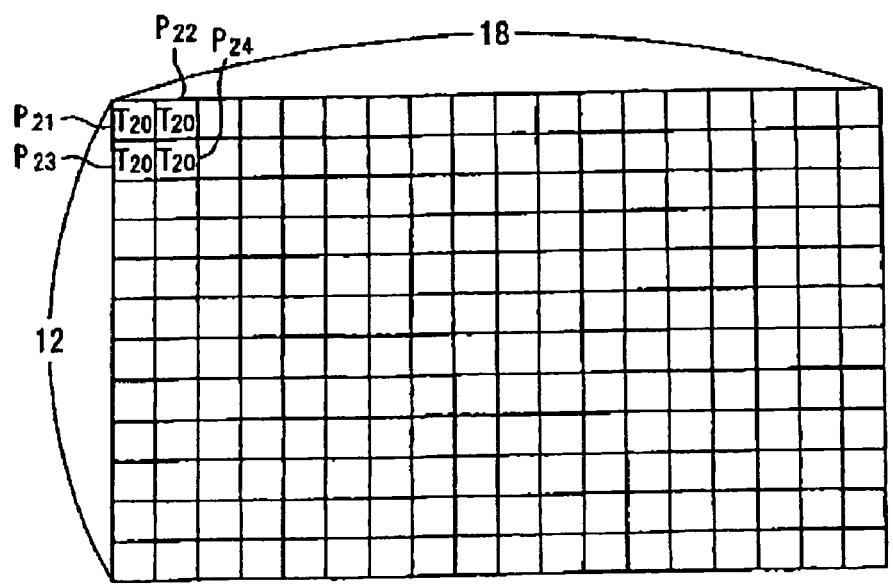
FIG. 11 is a drawing showing three cases of tentatively determining a transmission factors T2 of color modulation light valves.

FIG. 11 is a drawing showing the case of tentatively determining transmission factor T2 of the color modulation light valves.

Next, transmission factor T2 of each pixel of the color modulation light valves is tentatively determined in step S110. In the case the pixels of the four upper left blocks of the color modulation light valves are taken to be p21 (upper left), p22 (upper right), p23 (lower left) and p24 (lower right), then an initial value of T20 is given for transmission factor T2 of pixels p21 through p24 as shown in FIG. 11.

Figure 12:
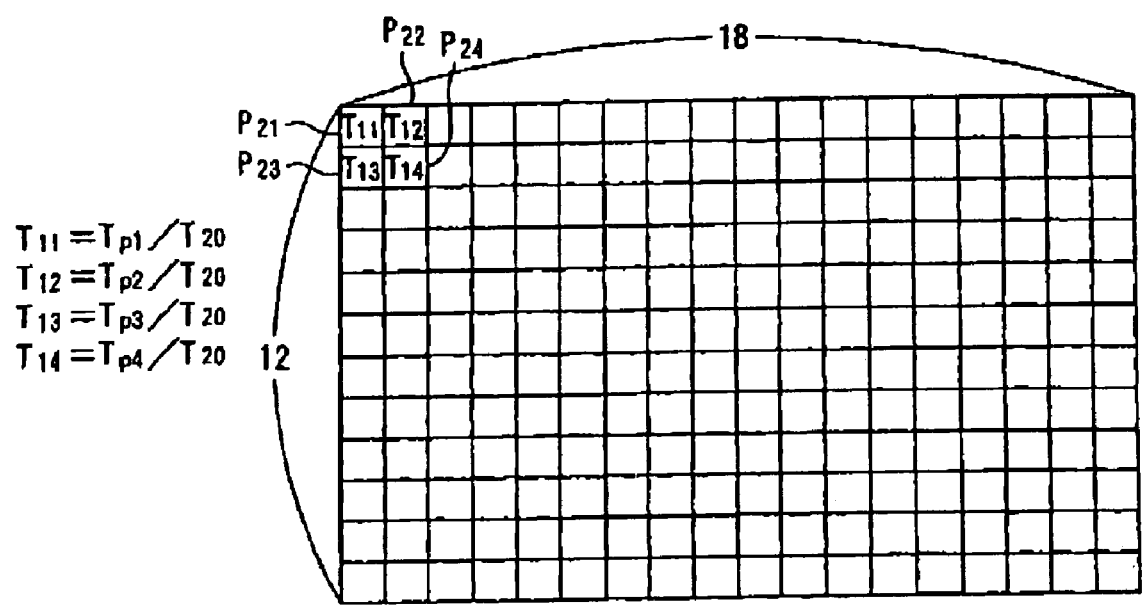
FIG. 12 is a drawing showing the case of calculating a transmission factor T1' of a luminance modulation light valve in pixel units of color modulation light valves.

FIG. 12 is a drawing showing the case in which transmission factor T1' of a luminance modulation light valve is calculated in pixel units of color modulation light valves.

Next, transmission factor T1' of the luminance modulation light valve is calculated in pixel units of the color modulation light valves in step S112. In the case of focusing on pixels p21 through p24, the corresponding transmission factors T11 through T14 of the luminance modulation light valve can be calculated from the following formulas (3) through (6) as shown in FIG. 12 if the optical modulation rates of pixels p21 through p24 are represented with Tp1 through Tp4, and gain G is represented with a "1".

Calculations are made using actual values. In the case Tp1=0.00012, Tp2=0.05, Tp3=0.02, Tp4=0.01 and T20=0.1, then T11=0.0012, T12=0.5, T3=0.2 and T4=0.1.

$$T11 = Tp1/T20 \quad (3)$$

$$T12 = Tp2/T20 \quad (4)$$

$$T13 = Tp3/T20 \quad (5)$$

$$T14 = Tp4/T20 \quad (6)$$

Figure 13A:
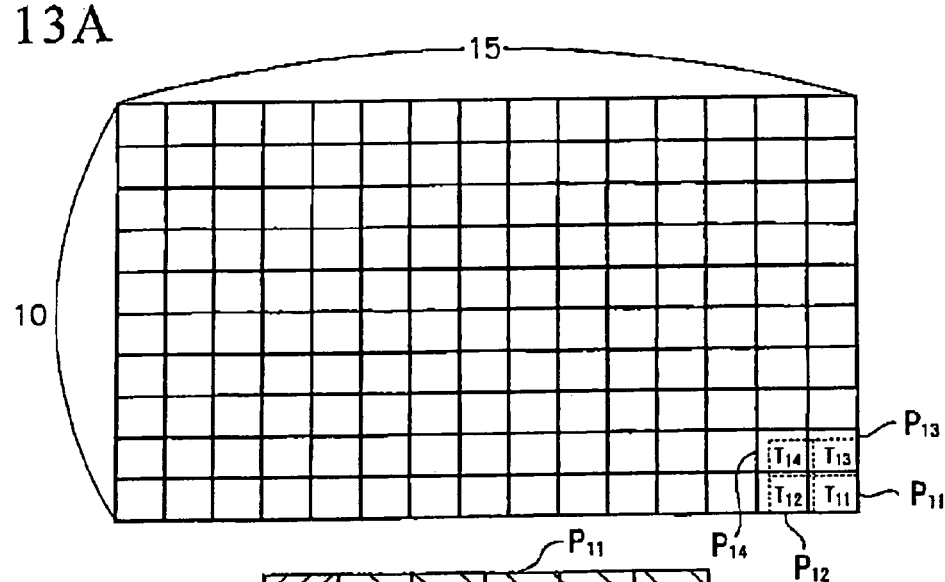
FIGS. 13A, 13B and 13C are drawings showing cases of determining transmission factor T1 of each pixel of a luminance modulation light valve.
Figure 13B:
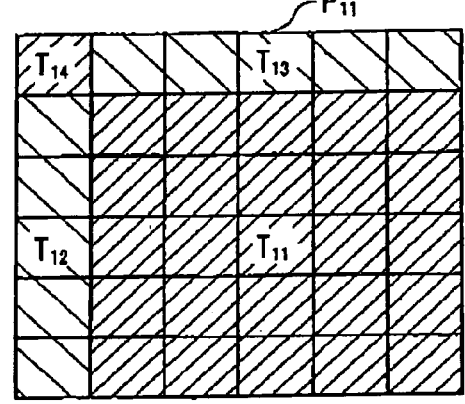
Figure 13C:
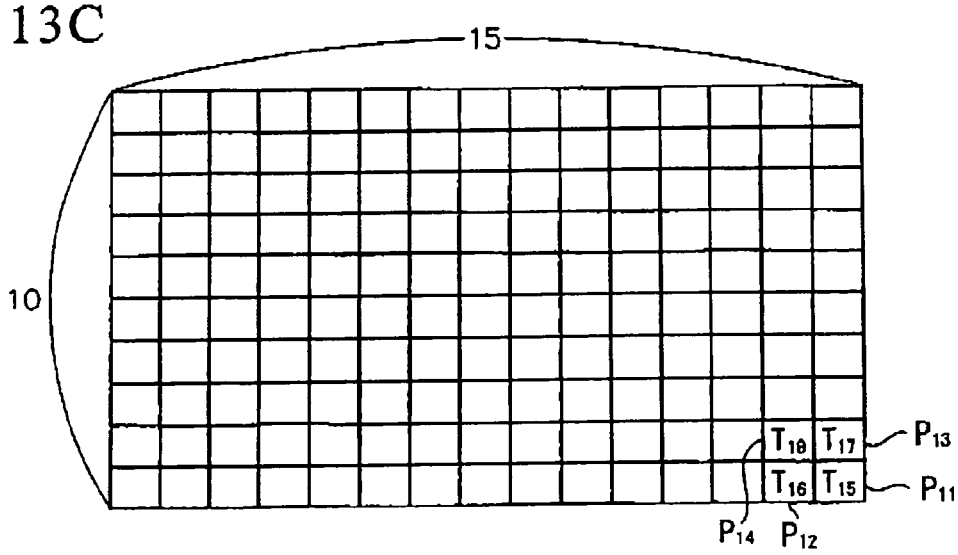

FIGS. 13A, 13B and 13C are drawings showing case of determining transmission factor T1 of each pixel of a luminance modulation light valve.

Next, transmission factor T1 of each pixel of the luminance modulation light valve is determined in step S114. In the case the pixels of the four lower right blocks of the luminance modulation light valve are taken to be p11 (lower right), p12 (lower left), p13 (upper right) and p14 (upper left), as shown in FIG. 13A, pixel p11 overlaps on the light path with pixels p21 through p24 since the color modulation light valves and luminance modulation light valve have different resolutions. Since the resolution of the color modulation light valves is 18×12 while the resolution of the luminance modulation light valve is 15×10, pixel p11 can be divided into a 6×6 square area based on its least common multiple. As shown in FIG. 13B, the overlapping surface area ratio between pixel p11 and pixels p21 through p24 then becomes 25:5:5:1. Thus, transmission factor T15 of pixel p11 can be calculated from formula (7) below as shown in FIG. 13C.

This calculation is made using actual values. In the case T11=0.0012, T12=0.5, T13=0.2 and T4=0.002, then from formula (7) below, T15=0.1008.

$$T15 = (T11\times25 + T12\times5 + T13\times5 + T14\times1)/36 \quad (7)$$

Transmission factors T16 through T18 of pixels p12 through p14 can also be determined in the same manner as p11 by calculating the weighted average from the surface area ratio.

Next, a control value corresponding to transmission factor T1 calculated for that pixel is read from control value registration table 400 for each pixel of the luminance modulation light valve, and the read control value is deter to be the control value of that pixel in step S116. For example, since T15=0.1008, referring to control value registration table 400 shows that 0.09 is the closest value as shown in FIG. 7. Thus, a value of "8" is read from control value registration table 400 for the control value of pixel p11.

Figure 14A:
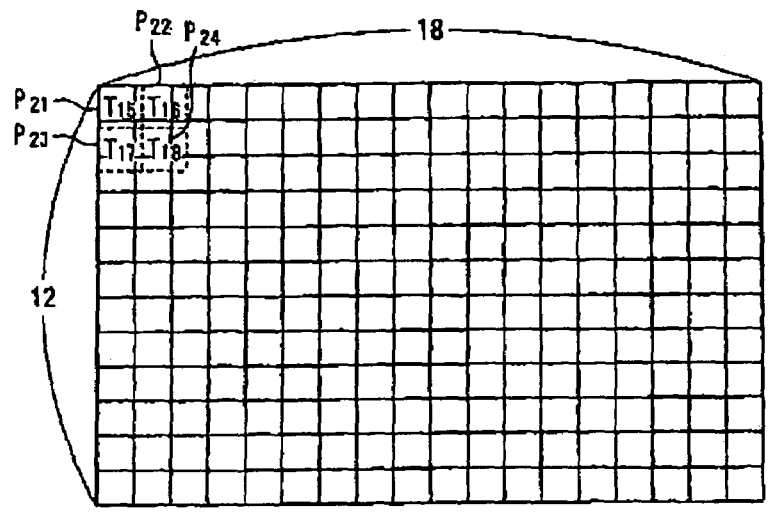
FIGS. 14A, 14B and 14C are drawings showing cases of determining transmission factor T2 of each pixel of color modulation light valves.
Figure 14B:
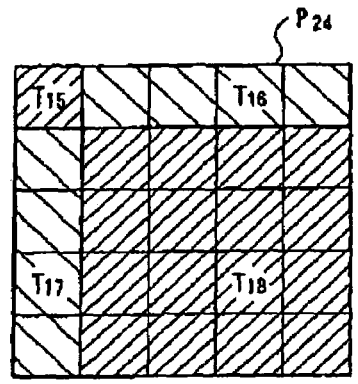
Figure 14C:
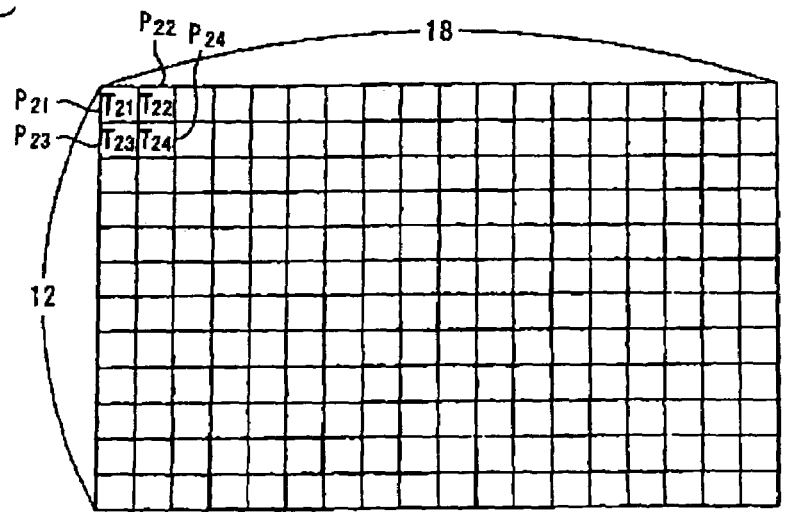

FIGS. 14A, 14B and 14C are drawings showing the case of determining transmission factor T2 for each pixel of each color modulation light valve.

Next, transmission factor T2 of each pixel of each color modulation light valve is determined in step S118. As shown in FIG. 14A, pixel p24 overlaps on the light path with pixels p11 through p14 since the resolutions of the color modulation light valves and the luminance modulation light valve are different. Since the resolution of the color modulation light valves is 18×12 while the resolution of the luminance modulation light valve is 15×10, pixel p24 can be divided into a 5×5 square area based on its least common multiple. As shown in FIG. 14B, the overlapping surface area ratio between pixel p24 and pixels p11 through p14 becomes 1:4:4:16. Thus, in the case of focusing on pixel p24, transmission factor T19 of the corresponding luminance modulation light valve can be calculated using formula (8) below. As shown in FIG. 14C, if gain G is assumed to be "1", then transmission factor T24 of pixel p24 can be calculated from formula (9) below.

These calculations are made using values. In the case T5=0.09, T16=0.33, T17=0.15, T18=0.06 and Tp4=0.01, then T19=0.1188 and T24=0.0842 from formulas (8) and (9) below.

$$T19 = (T15\times1 + T16\times4 + T17\times4 + T18\times6)/25 \quad (8)$$

$$T24 = Tp4/T19 \quad (9)$$

Transmission factors T21 through T23 of pixels p21 through p23 can be determined in the same wanner as pixel p24 by calculating the weighted average from the surface area ratio.

Next, control values corresponding to transmission factor T2 calculated for those pixels are read from control value registration tables 420R through 420B for each pixel of the color modulation light valves, and the read control values are determined as the control values of those pixels in step S120. For example, in the case T4=0.0842 for pixel p24 of liquid crystal light valve 40R, referring to control value registration table 420R shows that 0.07 is the closest value as shown in FIG. 8. Thus, a value of "7" is read from control value registration table 420R for the control value of pixel p24.

The determined control values are then output to light valve driving device 80 in step S122. As a result, an optical image is formed on the pixel surfaces of the luminance modulation light valve and color modulation light valves as a result of respectively driving the luminance modulation light valve and color modulation light valves.

In projection-type display device 100, light from light source 10 is primarily modulated by the luminance modulation light valve, light from the luminance modulation light valve is divided into light of the three primary colors of red, green and blue by dichroic mirrors 44a and 44b, and the divided light enters each color modulation light valve. At this time, the optical image of the luminance modulation light valve is formed on the pixel surfaces of each color modulation light valve through relay lens 16. The light from relay lens 16 is respectively secondarily modulated by each color modulation light valve, and the light from each color modulation light valve is synthesized to display an image by dichroic prism 48.

In this manner, the present embodiment is equipped with a light source 10, a luminance modulation light valve having a plurality of pixels capable of independently controlling transmission factor T1, dichroic mirrors 44a and 44b that divide light from the luminance modulation light valve into the three primary colors of red, green and blue, a plurality of color modulation light valves into which the light that has been divided with dichroic mirrors 44a and 44b enters and which have a plurality of pixels capable of independently controlling transmission factor T2, and a dichroic prism 48 that synthesizes the light from each of the color modulation light valves, and is provided with a relay lens 16 in the light path of luminance modulation section 14 and color modulation section 18 that forms an optical image of the luminance modulation light valve on the pixel surfaces of each color modulation light valve.

As a result, since light from light source 10 is modulated through the luminance modulation light valve and the color modulation light valves, a comparatively high luminance dynamic range and number of gradations can be realized. In addition, since an optical image of the luminance modulation light valve is formed on the pixel surfaces of each color modulation light valve through relay lens 16, the optical image of the luminance modulation light valve can be formed with comparatively high accuracy on the pixel surfaces of each color modulation light valve, and since the pixel surfaces of the luminance modulation light valve can be made to be large, modulation can be carried out with comparatively high accuracy. Thus, in comparison with the prior art, the possibility of deterioration of image quality can be reduced. Moreover, since high-precision optical components do not have to be used for the optical components of an illumination optical system, increases in costs can be suppressed.

Moreover, the present embodiment is provided with sub-relay lenses 50a and 50b along with a field lens 42B₂ that form an optical image of the luminance modulation light valve on the pixel surfaces of the color modulation light valve that corresponds to the light path having the longest path length among the plurality of light paths to each color modulation light valve.

As a result, as shown in FIG. 1, even if a structure is employed that has a different light path length to each color modulation light valve, an optical image of the luminance modulation light valve can be formed on the pixel surfaces of the color modulation light valves with comparatively high accuracy.

Moreover, sub-relay lenses 50a and 50b along with field lens 42B₂ are arranged in the present embodiment so that an erect optical image of the luminance modulation light valve formed on field lens 42B₂ through sub-relay lenses 50a is formed as an inverted optical image on the pixel surfaces of the color modulation light valves through sub-relay lens 50b.

As a result, an optical image of the luminance modulation light valve can be formed on the pixel surfaces of each color modulation light valve at nearly the same luminance distribution.

Moreover, in the present embodiment, the luminance modulation light valve and color modulation light valves are liquid crystal light valves.

As a result, since existing optical components can be used, increases in costs can be further suppressed.

Moreover, a uniform luminance distribution section 12 is provided in the light path of light source 10 and luminance modulation section 14 that makes the luminance distribution of light from light source 10 uniform.

As a result, the possibility of the occurrence of luminance unevenness can be decreased.

Moreover, in the present embodiment, uniform luminance distribution section 12 has a polarizing conversion element 12c that polarizes light from light source 10 in the polarizing direction capable of entering the luminance modulation light valve.

As a result, the luminance of displayed images can be improved since a larger quantity of light from light source 10 is eligible for modulation by the first optical modulation light valve.

Moreover, in the present embodiment, transmission factor T2 is tentatively determined for each pixel of the color modulation light valves, transmission factor T1 is determined for each pixel of the luminance modulation light valve based on the tentatively determined transmission factors T2 and HDR display data, transmission factor T2 of each pixel of the color modulation light valves is determined based on the determined transmission factors T1 and HDR display data, and a control value is determined for each pixel of the color modulation light valves based on the determined transmission factors T2.

As a result, since transmission factors T2 of the color modulation light valves that determine display resolution are determined first, the effects of error can be inhibited, thereby making it possible to reduce the possibility of deterioration of image quality. Moreover, since a number of gradation tables equivalent to the number of gradations is not required to be retained, there are very little increases in gradation table size and generation time even if the number of gradations is increased.

Moreover, in the present embodiment, transmission factor T1' is calculated in pixel units of the color modulation light valves based on the tentatively determined transmission factors T2 and HDR display data, and transmission factor T1 of each pixel of the luminance modulation light valve is calculated based on the calculated transmission factors T1'.

In the case the luminance modulation light valve and color modulation light valves each have different resolutions, instead of calculating transmission factor T1 of each pixel of the luminance modulation light valve directly based on the tentatively determined transmission factors T2, calculation of transmission factor T1' of the luminance modulation light valve in pixel units of the color modulation light valves based on the tentatively determined transmission factors T2 followed by calculating transmission factor T1 of each pixel of the luminance modulation light valve facilitates simpler processing. Thus, in the case the luminance modulation light valve and color modulation light valves each have different resolutions, transmission factor T1 of each pixel of the luminance modulation light valve can be calculated comparatively easily.

Moreover, in the present embodiment, transmission factor T1 of that pixel is calculated for each pixel of the luminance modulation light valve based on transmission factor T1' calculated for a pixel of the color modulation light valves that overlap on the light path with that pixel.

As a result, in the case the luminance modulation light valve and color modulation light valves each have different resolutions, since transmission factor T1 of each pixel of the luminance modulation light valve is a comparatively suitable value relative to transmission factor T2 of a pixel of the color modulation light valves that overlaps on the light path with that pixel, the possibility of deterioration of image quality can be further reduced. In addition, transmission factor T1 of each pixel of the luminance modulation light valve can be calculated more simply.

Moreover, in the present invention, a weighted average of transmission factor T1' calculated for a pixel of the color modulation light valves that overlaps on the light path with that pixel is calculated for each pixel of the luminance modulation light valve as the transmission factor T1 of that pixel.

As a result, in the case the luminance modulation light valve and color modulation light valves each have different resolutions, since transmission factor T1 of each pixel of the luminance modulation light valve is an even more suitable value relative to transmission factor T2 of the pixel of the color modulation light valves that overlaps on the light path with that pixel, the possibility of deterioration of image quality can be further reduced. In addition, transmission factor T1 of each pixel of the luminance modulation light valve can be calculated more simply.

Moreover, in the present embodiment, transmission factor T2 of that pixel is made to be calculated for each pixel of the color modulation light valves based on transmission factor T1 determined for a pixel of the luminance modulation light valve that overlaps on the light path with that pixel.

As a result, in the case the luminance modulation light valve and color modulation light valves each have different resolutions, since transmission factor T2 of each pixel of the color modulation light valves is a comparatively suitable value relative to transmission factor T1 of the pixel of the luminance modulation light valve that overlaps on the light path with that pixel, the possibility of deterioration of image quality can be further reduced. In addition, transmission factor T2 of each pixel of the color modulation light valves can be calculated more simply.

Moreover, in the present embodiment, a weighted average of transmission factor T1 determined for a pixel of the luminance modulation light valve that overlaps on the light path with that pixel is calculated for each pixel of the color modulation light valves, and transmission factor T2 of that pixel is made to be calculated based on that average value.

As a result, in the case the luminance modulation light valve and color modulation light valves each have different resolutions, since transmission factor T2 of each pixel of the color modulation light valves is an even more suitable value relative to transmission factor T1 of the pixel of the luminance modulation light valve that overlaps on the light path with that pixel, the possibility of deterioration of image quality can be further reduced. In addition, transmission factor T2 of each pixel of the color modulation light valves can be calculated more simply.

Moreover, in the present embodiment, a luminance modulation light valve is used for the first stage optical modulation element, while color modulation light valves are used for the second stage optical modulation elements.

As a result, since only a single optical modulation element need be added to a projection-type display device of the prior art, projection-type display device 100 can be composed comparatively easily.

In the aforementioned embodiment, the luminance modulation light valve corresponds to the first optical modulation element of inventions 1 through 14, the color modulation light valves correspond to the second optical modulation elements of examples 1 through 5 and 8 through 12, and the uniform luminance distribution section 12 corresponds to the uniform luminance distribution unit of invention 6, 7 or 13. In addition, dichroic mirrors 44a and 44b correspond to the optical separation unit of inventions 1 through 3 and 8 through 10, dichroic prism 48 corresponds to the light synthesis unit of invention 2 or 9, and sub-relay lens 50a and 50b along with field lens $42B_2$ correspond to the second relay lens of invention 3, 4, 10 or 11.

In addition, in the aforementioned embodiment, sub-relay lens 50a corresponds to the first sub-relay lens in invention 4 or 11, while sub-relay lens 50b corresponds to the second sub-relay lens in invention 4 or 11.

Figure 15:
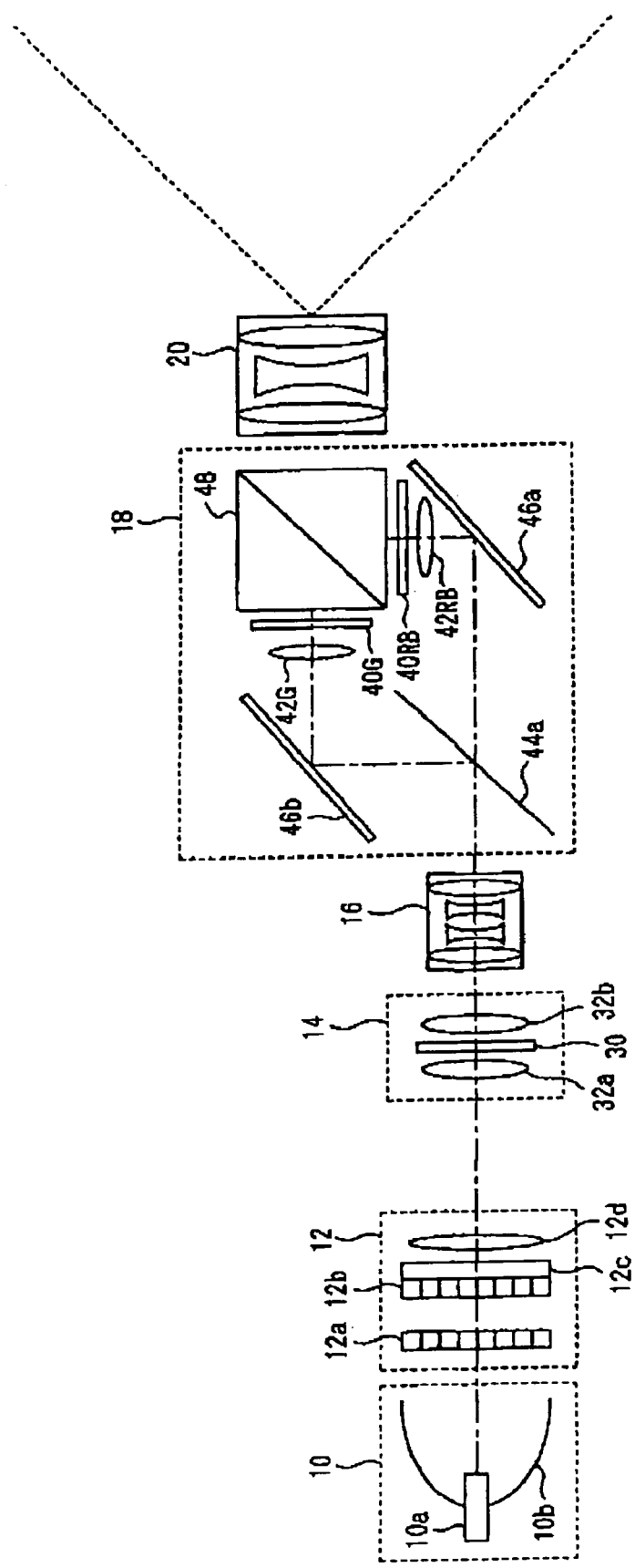
FIG. 15 is a block diagram showing another hardware configuration of a projection-type display device 100.

Furthermore, in the aforementioned embodiment, although sub-relay lenses 50a and 50b along with field lens $42B_2$ are provided in the light path from dichroic minor 44b to liquid crystal light valve 40B since a constitution is employed in which light from the luminance modulation light valve is divided into light of the three primary colors of red, green and blue, the present embodiment is not limited to this, but rather as shown in FIG. 15, it is not necessary to provide sub-relay lenses 50a and 50b along with field lens $42B_2$ in the case of employing a constitution in which light from the luminance modulation light valve is divided into light of two of the three primary colors of red, green and blue.

FIG. 15 is a block diagram showing another hardware configuration of projection-type display device 100.

As shown in FIG. 15, projection-type display device 100 is composed of a light source 10, a uniform luminance distribution section 12, a luminance modulation section 14, a relay lens 16, a color modulation section 18 and a projection section 20.

Color modulation section 18 is composed of two liquid crystal light valves 40RB and 40G, two field lenses 42RB and 42G, one dichroic mirror 44a, two mirrors 46a and 46b and a dichroic prism 48. First, together with light from relay lens 16 being divided into two colors among the primary colors of red, green and blue (red and blue) and one color among the primary colors of red, green and blue (green) by dichroic mirror 44a, it enters liquid crystal light valves 40RB and 40G through field lenses 42RB and 42G and mirrors 46a and 46b. The luminance of the divided two primary color and one primary color light is then modulated by each liquid crystal light valve 40RB and 40G, and the modulated three primary color light is converged by dichroic prism 48 and emitted to projection section 20.

As a result, since sub-relay lenses 50a and 50b, field lenses $42B_1$ through $42B_3$ and liquid crystal light valve 40B are not required to be provided, production costs can be reduced.

In addition, although the aforementioned embodiment is composed by using active matrix type liquid crystal display elements for liquid crystal light valves 30 and 40R through 40B, the aforementioned embodiment is not limited to this, but rather can also be composed by using passive matrix type liquid crystal display elements and segment type liquid crystal display elements for liquid crystal light valves 30 and 40R through 40B. An active matrix type liquid crystal display offers the advantage of enabling a fine gradation display, while passive matrix type liquid crystal display elements and segment type liquid crystal display elements offer the advantage of being able to be produced inexpensively.

In addition, although the aforementioned embodiment is composed so as to determine a control value of each pixel of a luminance modulation light valve based on a control value registration table 400 by providing a single control value registration table 400 since luminance modulation light valve 30 is composed of a single liquid crystal light valve 30, the aforementioned embodiment is not limited to this, but rather can also be composed so as to determine the control value of each pixel of a luminance modulation light valve based on control value registration tables 400R through 400B by providing a control value registration table 400R, 400G and 400B for each primary color of the colors red, green and blue. Since the luminance modulation light valve modulates luminance over the entire wavelength range of light, the transmission factors of light of typical wavelengths are registered in control value registration table 400. However, the registered transmission factors are not necessarily the mission factors for each of the wavelengths of the three primary colors of red, green and blue.

Therefore, control value registration tables 400R through 400B are composed by precisely measuring the transmission factors corresponding to the control values for each of the primary colors of red, green and blue for the luminance modulation light valve. Next, a transmission factor T1 of each pixel of the luminance modulation light valve is determined for each of the three primary colors of red, green and blue, the transmission factor that most closely approximates the transmission factor T1 calculated for R is searched for in control value registration table 400R, and the control value corresponding to the transmission factor found as a result of that search is read out. Similarly, the corresponding control values are read from control value registration tables 400G and 400B based on the transmission factor T1 calculated for G and transmission factor T1 calculated for B. The average value of the control values read for the same pixel of the luminance modulation light valve is then calculated as the control value of that pixel.

As a result, since the control value of each pixel of the luminance modulation light valve is a comparatively suitable value relative to the transmission factor for each of the three primary colors of red, green and blue of the pixel of the color modulation light valves that overlaps on the lid path with that pixel, the possibility of deterioration of image quality can be further reduced.

In addition, in the aforementioned embodiment, although the color modulation light valves are composed in the form of optical modulation elements that determine display resolution, the aforementioned embodiment is not limited to this, but rather can also be composed such that the luminance modulation light valve is the optical modulation element that determines display resolution. In this case, transmission factor T2 of each pixel of the luminance modulation light valve (when T2 is taken to be the transmission factor of the optical modulation element determined last) is determined after first determining transmission factor T1 of each pixel of the color modulation light valves (when T1 is taken to be the transmission factor of the optical modulation element determined first). In addition, the aforementioned embodiment may also be composed so that the control value of each pixel of the luminance modulation light valve is determined based on control value registration tables 400R through 400B by providing control value registration tables 400R through 400B in the same manner as previously described.

More specifically, transmission factor T2 of each pixel of the luminance modulation light valve is determined for each of the primary colors of red, green and blue, the transmission factor that most closely approximates transmission factor T2 calculated for R is searched for in control value registration table 400R, and the control value corresponding to the transmission factor found as a result of that search is read out. Similarly, the corresponding control values are read from control value registration tables 400G and 400B based on the transmission factor T2 calculated for G and transmission factor T2 calculated for B. The average value of the control values read for the same pixel of the luminance modulation light valve is then calculated as the control value of that pixel.

As a result, since the control value of each pixel of the luminance modulation light valve is a comparatively suitable value relative to the transmission factor for each of the three primary colors of red, green and blue of the pixel of the color modulation light valves that overlaps on the light path with that pixel, the possibility of deterioration of image quality can be further reduced.

In addition, although the aforementioned embodiment is composed so as to determine the control values of the luminance modulation light valve and color modulation light valves based on HDR display data, in the case of using ordinary RGB image data consisting of 8 bits for each color, the values of 0 to 255 of ordinary RGB image data are merely relative values of 0 to 255 and are not physical quantities of luminance. Consequently, in order for a display device of the present invention to perform display based on ordinary RGB image data, the physical luminance Rp to be displayed or transmission factor Tp of the entire display device must be determined from the ordinary RGB image.

Figure 16:
FIG. 16 is a drawing showing the data structure of an input value registration table 440.

FIG. 16 is a drawing showing the data structure of an input value registration table 440.

Consequently, if the input value registration table 440 shown in FIG. 16 is used, conversion can be made from input values of 0 to 255 of an ordinary RGB image to physical transmission factors Tp, and depending on the manner in which these transmission factors Tp of this table are set up, the view (gradation characteristics) of the display for the ordinary RGB image can be changed easily. Since the transmission factors Tp in this table are equivalent to Tp in the aforementioned formula (2), once this value has been determined, transmission factors T1 and T2 of a plurality of optical modulation elements are subsequently determined to allow display by carrying out processing similar to that of the aforementioned embodiment.

Figure 17:
FIG. 17 is a drawing showing the data structure of an input value registration table 460.

FIG. 17 is a drawing showing the data structure of an input value registration table 460.

Input value registration table 460 of FIG. 17 uses luminance Rp instead of transmission factor Tp. Since the luminance Rp in this table is equivalent to the Rp in the aforementioned formula (1), once this value has been determined, transmission factors T1 and T2 of a plurality of optical modulation elements are subsequently determined to allow display by carrying out processing similar to that of the aforementioned embodiment.

In addition, although the aforementioned embodiment is composed so as to calculate for each pixel of the color modulation light valves a weighted average of transmission factor T1 determined for a pixel of the luminance modulation light valve that overlaps on the light path with that pixel, and transmission factor T2 of that pixel is then calculated based on that average value, the aforementioned embodiment is not limited to this, but rather the transmission factor T1 table corresponding to that control value can be read from control value registration table 400 based on the control value determined for a pixel of the luminance modulation light valve that overlaps on the light path with that pixel, a weighted average of the read transmission factor T1 table can be calculated, and transmission factor T2 of that pixel can be calculated based on that average value for each pixel of the color modulation light valves.

In addition, although the aforementioned embodiment is composed so as to calculate an average value of transmission factor T1' calculated for each of the three primary colors of red, green and blue for the same pixel as transmission factor T1' of that pixel, the aforementioned embodiment is not limited to this, but rather may also be composed so that transmission factor T1' is calculated as is for the three primary colors of red, green and blue, and in step S114, the average value of transmission factor T1 calculated for each of the three primary colors of red, green and blue for the same pixel is calculated as the transmission factor T1 of that pixel.

In addition, although a constitution is employed in the aforementioned embodiment in which a weighted average of transmission factor T1 determined for a pixel of the luminance modulation light valve that overlaps on the light path with that pixel is calculated for each pixel of the color modulation light valves, and transmission factor T2 of that pixel is calculated based on that average value, the aforementioned embodiment is not limited to this, but rather a constitution can also be employed in which a maximum value, minimum value or average value of transmission factor T1 determined for a pixel of the luminance modulation light valve that overlaps on the light path with that pixel is calculated for each pixel of the color modulation light valves, and transmission factor T2 of that pixel is calculated based on calculated value.

In addition, although projection-type display device 100 is composed by providing transmitting optical modulation elements in the aforementioned embodiment, the luminance modulation light valve or color modulation light valves may be composed with reflecting optical modulation elements such as digital micromirror devices (DMD).

In this case, the reflection factors are determined based on HDR display data.

In addition, although optical modulation elements having small numbers of pixels and gradations are used to facilitate the explanation in the aforementioned embodiment, even in the case optical modulation elements are used having large numbers of pixels and gradations, they can be processed in the same manner as the aforementioned embodiment.

In addition, although gain G is set to 1.0 to facilitate the explanation in the aforementioned embodiment, gain G may no longer by 1.0 depending on the hardware configuration. In addition, when considering actual calculation costs, it is preferable to register the control values and transmission factors in the control value registration tables in a form that incorporates the effect of gain G.

In addition, although the explanation of the aforementioned embodiment uses the case of executing a control program preliminarily stored in ROM 72 when carrying out the processing shown in the flow chart of FIG. 9, the aforementioned embodiment is not limited to this, but rather that program may be executed by loading into RAM 74 from a storage medium on which the program indicated in these steps has been stored.

Here, a storage medium refers to a semiconductor storage medium such as RAM or ROM, a magnetically storing storage medium such as FD or HD, an optically read storage medium such as a CD, CDV, LD or DVD, or a combination magnetically storing/optically read storage medium such as an MO, the reading method may be electrical, magnetic or optical, and all types of storage media are included provided it is a storage medium that can be read by a computer.

In addition, in the aforementioned embodiment, although a light propagation structure of an optical system and optical display device along with a light propagation method of an optical system and display method of an optical display device were applied to a projection-type display device 100 as shown in FIG. 1, the aforementioned embodiment is not limited to this, but rather can be applied to other cases as well provided it is within a range that does not deviate from the scope or spirit of the present invention.

In addition, although a relay lens composed primarily of transmitting optical elements is used in the aforementioned embodiment as a relay optical system for forming an optical image of a liquid crystal light valve of a front stage on a liquid crystal light valve of a rear stage, the aforementioned embodiment is not limited to this, but rather a reflecting relay optical system may also be used that is primarily composed of reflecting optical elements (mirrors).

Figure 18:
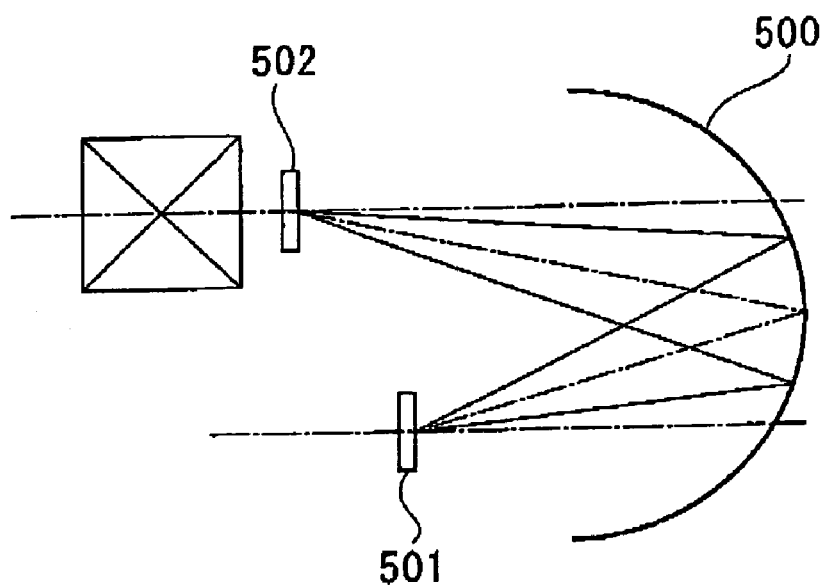
FIG. 18 is a drawing schematically showing an example of the constitution of a reflecting relay optical system composed of mirrors.
Figure 19:
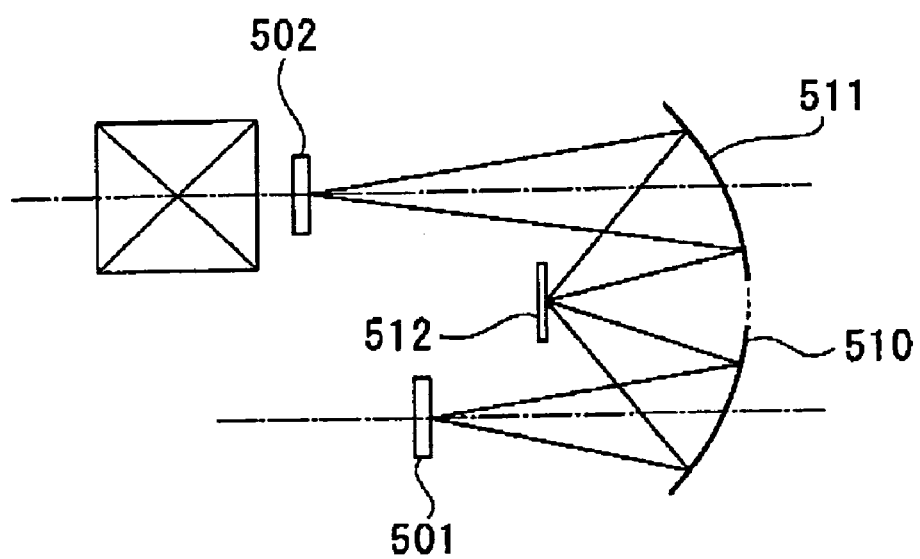
FIG. 19 is a drawing schematically showing an example of the constitution of a reflecting relay optical system composed of mirrors.
Figure 20:
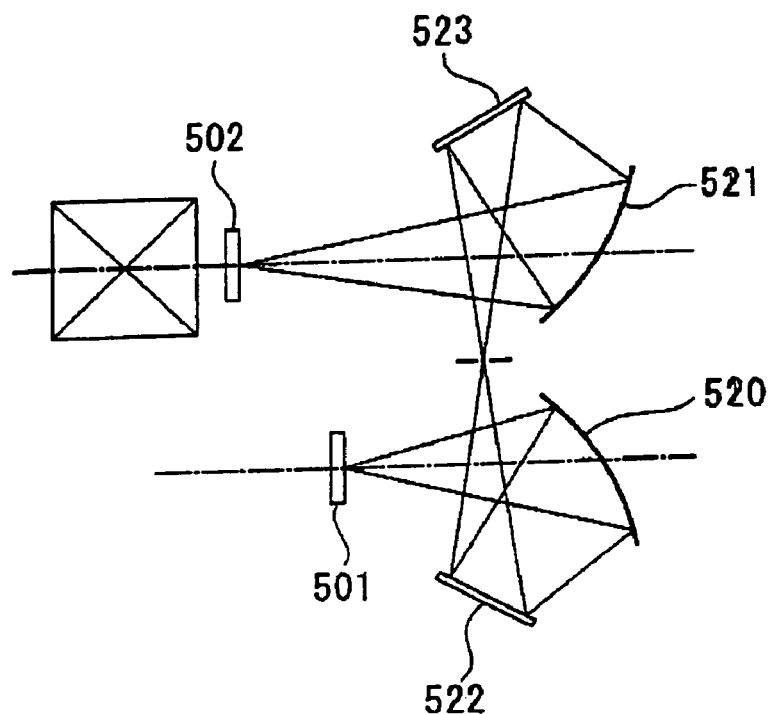
FIG. 20 is a drawing schematically showing an example of the constitution of a reflecting relay optical system composed of mirrors.
Figure 21:
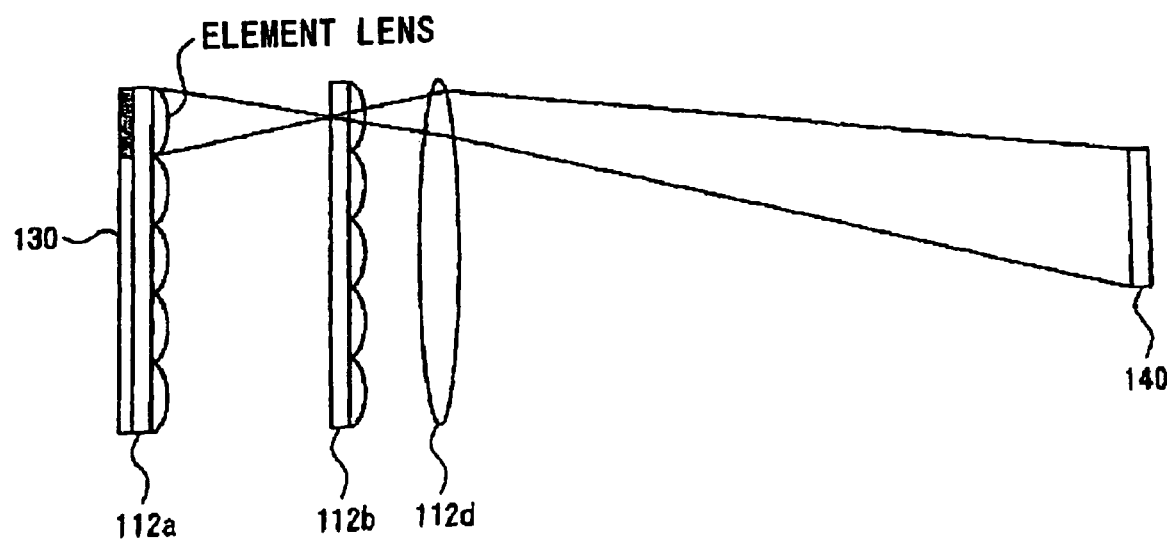
FIG. 21 is a drawing showing the constitution of a light path of a first optical modulation element and second optical modulation element in a projection-type display device described in Patent Document 2.

FIGS. 18 through 20 schematically show examples of the constitution of a reflecting relay optical system composed of mirrors.

The relay optical system of FIG. 18 is composed to form an optical image of a front stage light valve 501 on a rear sage light valve 502 through a single concave mirror 500. Namely, in this relay optical system, the image forming relationship (relationship in which two light valves 501 and 502 are nearly conjugated) is completed by a single reflection. Concave mirror 500 may be a spherical mirror or an aspherical mirror not having axial symmetry.

The relay optical systems of FIGS. 19 and 20 are composed to complete an image forming relationship by multiple reflections to obtain a high image forming property. In other words, in the relay optical systems of FIGS. 19 and 20, a plurality of reflecting optical elements (mirrors) are arranged on the light path, thereby correcting image aberration to increase the image forming performance of the relay optical systems. In this case, as a result of containing flat mirrors, the degree of freedom of the layout is improved.

More specifically, the relay optical system of FIG. 19 has two concave mirrors 510 and 511, and a flat mirror 512 for guiding the reflected light of concave mirror 510 to concave mirror 511. A light bundle from front stage light valve 501 enters rear stage light valve 502 after being reflected in the order of concave mirror 510, flat mirror 512 and concave mirror 511. Furthermore, in this example, flat mirror 512 has the function equivalent to a aperture stop. In addition, concave mirror 510 and concave mirror 511 may be integrally composed.

The relay optical system of FIG. 20 has two concave mirrors 520 and 521 and two flat mirrors 522 and 523. A light bundle from front stage light valve 501 enters rear stage light valve 502 after being reflected in the order of concave mirror 520, flat mirror 522, flat mirror 523 and concave minor 521. An at stop may be arranged on the light path between flat mirror 522 and flat mirror 523.

This type of reflecting relay optical system is advantageous for reducing aberration (e.g., color aberration). Namely, the occurrence of aberration (e.g., color aberration) caused by the use of transmitting optical elements (lenses) is avoided in a reflecting relay optical system.

In addition, the relay optical systems shown in FIGS. 19 and 20 have bilateral telecentricity as a result of using a plurality of mirrors. Consequently, the brightness, tint, contrast and so forth of images formed on the surfaces of the rear stage light valve can be reliably made to be uniform, thereby resulting in satisfactory image display quality.

Furthermore, the use a concave mirror or convex mirror (including aspheric mirrors for both) instead of flat mirrors in the relay optical systems of FIGS. 19 and 20 makes it possible to obtain a constitution in which image aberration can be corrected more easily.

In addition, mirrors of a form in which an aluminum, silver or other metal film is formed on a substrate, mirrors of a type having a reflective film composed of a dielectric multilayer film (high reflection film) or combinations of both types are applied for the mirrors used in the aforementioned reflecting relay optical systems. Reflective films composed of a dielectric multilayer film can be formed by, for example, alternately layering a high refractive index film and low refractive index film on a glass, silicon or other substrate to obtain a high reflection factor by utilizing the interference generated by the reflected light at the film boundaries.

While preferred embodiments of the invention have been described and illustrated above, it should be understood that these are exemplary of the invention and are not to be considered as limiting. Additions, omissions, substitutions and other modifications can be made without departing from the spirit or scope of the present invention. Accordingly, the invention is not to be considered as being limited by the foregoing description, and is only limited by the scope of the appended claims.

What is claimed is:

1. A light propagation structure applied to an optical system that modulates light from a light source through a first optical modulation element and each of a plurality of second optical modulation elements, comprising: a first optical modulation element having a plurality of pixels capable of independently controlling light propagation characteristics, an optical separation unit that divides light from the first optical modulation element into light of a plurality of different specific wavelength regions, and a plurality of second optical modulation elements into which the light divided with the optical separation unit respectively enters and have a plurality of pixels capable of independently controlling light propagation characteristics, wherein
 a relay optical system is provided in the light path of the first optical modulation element and the optical separation unit that forms an optical image of the first optical modulation element on the pixel surfaces of each of the second optical modulation elements.

2. A light propagation structure according to claim 1, wherein the relay optical system is disposed in a light path between the first optical modulation element and the optical separation unit.

3. A light propagation structure according to claim 1, wherein the pixels of the first optical modulation element correspond on a 1:1 basis with the pixels of the second modulation element.

4. An optical display device that displays images by modulating light from a light source through a first optical modulation element and each of a plurality of second optical modulation elements, comprising: a light source, a first optical modulation device having a plurality of pixels capable of independently controlling light propagation characteristics, an optical separation unit that divides light form the first optical modulation element into a plurality of different specific wavelength regions, a plurality of second optical modulation elements into which light divided with the optical separation unit respectively enters and have a plurality of pixels capable of independently controlling light propagation characteristics, and a light synthesis unit that synthesizes light from each of the second optical modulation elements, wherein
 a relay optical system is provided in the light path of the first optical modulation element and the optical separation unit that forms an optical image of the first optical modulation element on the pixel surfaces of each of the second optical modulation elements.

5. An optical display device according to claim 4, wherein the relay optical system has bilateral telecentricity.

6. An optical display device according to claim 4, wherein a second relay optical system is provided in at least one light path for which the light path length is larger than a specific light path among a plurality of light paths from the optical separation unit to each of the second optical modulation elements, which forms an optical image of the first optical modulation element on the pixel surfaces of the second optical modulation element corresponding to said light path.

7. An optical display device according to claim 6, wherein the second relay optical system has a first sub-relay lens, a second sub-relay lens arranged closer to the second optical modulation elements than the first sub-relay lens, and a field lens arranged between the first sub-relay lens and the second sub-relay lens, and
 the first sub-relay lens, the second sub-relay lens and the field lens are arranged so that an erect optical image of the first optical modulation element formed on or nearby the field lens through the first sub-relay lens is formed as an inverted optical image on the pixel surfaces of the second optical modulation elements through the second sub-relay lens.

8. An optical display device according to claim 4, wherein the first and second optical modulation elements are liquid crystal light valves.

9. An optical display device according to claim 4, wherein a uniform luminance distribution unit that makes the luminance distribution of light from the light source uniform is provided in the light path of the light source and the first optical modulation element.

10. An optical display device according to claim 9, wherein the uniform luminance distribution unit has a polarizing conversion element that polarizes light from the light source corresponding to the polarizing direction capable of entering the first optical modulation element.

11. An optical display device according to claim 4, wherein the relay optical system is disposed in a light path between the first optical modulation element and the optical separation unit.

12. An optical display device according to claim 4, wherein the pixels of the first optical modulation element correspond on a 1:1 basis with the pixels of the second modulation element.

13. A light propagation method applied to an optical system that modulates light from a light source through a first optical modulation element and each of a plurality of second optical modulation elements, comprising: a first optical modulation element having a plurality of pixels capable of independently controlling light propagation characteristics, an optical separation unit that divides light from the first optical modulation element into light of a plurality of different specific wavelength regions, and a plurality of second optical modulation elements into which the light divided with the optical separation unit respectively enter and having a plurality of pixels capable of independently controlling light propagation characteristics, wherein
 an optical image of the first optical modulation element is formed on the pixel surfaces of each of the second optical modulation elements through a relay optical system in the light path of the first optical modulation element and the optical separation unit.

14. A light propagation method according to claim 13, wherein the relay optical system is disposed in a light path between the first optical modulation element and the optical separation unit.

15. A light propagation method according to claim 13, wherein the pixels of the first optical modulation element correspond on a 1:1 basis with the pixels of the second modulation element.

16. A display method of an optical display device that displays images by modulating light from a light source through a first optical modulation element and each of a plurality of second optical modulation elements, comprising: a light source, a first optical modulation device having a plurality of pixels capable of independently controlling light propagation characteristics, an optical separation unit that divides light form the first optical modulation element into a plurality of different specific wavelength regions, a plurality of second optical modulation elements into which light divided with the optical separation unit respectively enters and have a plurality of pixels capable of independently controlling light propagation characteristics, and a light synthesis unit that synthesizes light from each of the second optical modulation elements, wherein an optical image of the first optical modulation element is formed on the pixel surfaces of each of the second optical modulation elements through a relay optical system in the light path of the first optical modulation element and the optical separation unit.

17. A display method according to claim 16, wherein the relay optical system is disposed in a light path between the first optical modulation element and the optical separation unit.

18. A display method according to claim 16, wherein the pixels of the first optical modulation element correspond on a 1:1 basis with the pixels of the second modulation element.

* * * * *